(12) United States Patent
Otsuka et al.

(10) Patent No.: US 10,059,381 B2
(45) Date of Patent: Aug. 28, 2018

(54) JOINT STRUCTURE BODY OF MEMBERS

(71) Applicant: NIPPON STEEL & SUMITOMO METAL CORPORATION, Tokyo (JP)

(72) Inventors: Kenichiro Otsuka, Tokyo (JP); Hiroki Fujimoto, Tokyo (JP); Yoshiaki Nakazawa, Tokyo (JP); Masanori Yasuyama, Tokyo (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 46 days.

(21) Appl. No.: 15/113,479

(22) PCT Filed: Mar. 4, 2015

(86) PCT No.: PCT/JP2015/056389
§ 371 (c)(1),
(2) Date: Jul. 22, 2016

(87) PCT Pub. No.: WO2015/133531
PCT Pub. Date: Sep. 11, 2015

(65) Prior Publication Data
US 2017/0008573 A1    Jan. 12, 2017

(30) Foreign Application Priority Data
Mar. 5, 2014  (JP) ................. 2014-043229

(51) Int. Cl.
*B62D 27/02* (2006.01)
*B62D 25/20* (2006.01)
*B23K 11/11* (2006.01)

(52) U.S. Cl.
CPC ............ *B62D 27/023* (2013.01); *B23K 11/11* (2013.01); *B62D 25/20* (2013.01); *B62D 25/2036* (2013.01); *B62D 27/026* (2013.01)

(58) Field of Classification Search
CPC .. B62D 25/20; B62D 25/2036; B62D 25/025; B62D 21/03; B62D 27/02
See application file for complete search history.

(56) References Cited

U.S. PATENT DOCUMENTS 7,971,466 B2 *   7/2011   Yoshitome ............. B21D 53/88
                                                 72/355.2
8,235,458 B2 *   8/2012   Mori .................... B62D 21/157
                                                 296/193.06
(Continued)

FOREIGN PATENT DOCUMENTS

CN          1535880 A      10/2004
CN         101415598 A      4/2009
(Continued)

OTHER PUBLICATIONS

Chinese Office Action and Search Report, dated May 19, 2017, for corresponding Chinese Application No. 201580011164.7 with an English translation of the Office Action.
(Continued)

*Primary Examiner* — Jonathan P Masinick
(74) *Attorney, Agent, or Firm* — Birch, Stewart, Kolasch & Birch, LLP

(57) ABSTRACT

Mechanical properties, in particular torsional rigidity and absorbed energy properties in axial crushing, of a joint structure body including a joint formed by joining members are further improved.
Provided is a first member, a second member, an end of the second member being thrust against a surface of the first member, and a joint that joins the first member and the second member are included. The joint includes an end flange that is formed continuously along the end of the second member and of which at least one part overlaps the surface of the first member and a unit joint that joins the end flange and the first member. The end flange is formed
(Continued)

continuously to at least one part of the end of the second member via a rising curved surface portion and the rising curved surface portion includes a wall-thickened portion of which a sheet thickness is made larger than a sheet thickness of the second member. At least one part of the unit joint is provided in a range of 3 mm or less from a boundary between the end flange and the wall-thickened portion.

7 Claims, 29 Drawing Sheets

(56) References Cited

U.S. PATENT DOCUMENTS

| | | | | |
|---|---|---|---|---|
| 9,199,670 | B2* | 12/2015 | Otsuka | B62D 21/157 |
| 2003/0178833 | A1 | 9/2003 | Muller | |
| 2015/0061323 | A1 | 3/2015 | Otsuka et al. | |
| 2015/0174634 | A1* | 6/2015 | Nishimura | B21D 22/26 72/343 |
| 2015/0367392 | A1* | 12/2015 | Nishimura | B21D 5/0209 72/379.2 |
| 2016/0199897 | A1* | 7/2016 | Otsuka | B21D 22/26 72/352 |
| 2016/0279692 | A1* | 9/2016 | Ito | B21D 22/26 |

FOREIGN PATENT DOCUMENTS

| | | |
|---|---|---|
| CN | 102292255 A | 12/2011 |
| JP | 2002-255062 A | 9/2002 |
| JP | 2003-252157 A | 9/2003 |
| JP | 2007-14978 A | 1/2007 |
| RU | 56322 U1 | 9/2006 |
| WO | WO 2013/133157 A1 | 9/2013 |
| WO | WO 2013/154114 A1 | 10/2013 |

OTHER PUBLICATIONS

Russian Search Report and English translation, for Russian Application No. 2016134915/11, completed Jun. 6, 2017.
International Search Report for PCT/JP2015/056389 dated May 19, 2015.
Written Opinion of the International Searching Authority for PCT/JP2015/056389 (PCT/ISA/237) dated May 19, 2015.
Korean Office Action dated Aug. 22, 2017, for corresponding Korean Application No. 10-2016-7023117, with partial English translation.
Indian Office Action, dated Mar. 22, 2018, for corresponding Indian Application No. 201617025516.

* cited by examiner

JOINT STRUCTURE BODY OF MEMBERS

TECHNICAL FIELD

The present invention relates to a joint structure body formed by joining members.

BACKGROUND ART

An automobile body has a joint where an end of a second member is joined to a surface of a first member so as to be thrust against the surface. As such a joint, for example, a joint between a side sill and a floor cross member, a joint between a tunnel and a floor cross member, a joint between a roof rail and a roof cross member, a joint between a wheel house and a rear floor cross member, and a joint between a front side member and a dash cross member are given. At the joints illustrated herein, the end of the second member is provided with a flange, and the second member is joined to the first member using the flange.

In the automobile body, high mechanical properties are required also for a structure body having such a joint. For example, for such a joint structure body, it is regarded as important to improve the torsional rigidity and the absorbed energy properties in axial crushing. In this regard, in Patent Literature 1, a structure in which the second member side is provided with a continuous flange with no notch and a spot welding portion is formed in the flange to join the second member to the first member is disclosed. By such a joint structure described in Patent Literature 1, the deformation of car width members can be suppressed and the torsional rigidity can be improved.

CITATION LIST

Patent Literature

Patent Literature 1: WO 2013/154114

SUMMARY OF INVENTION

Technical Problem

Although the deformation of car width members is suppressed and the torsional rigidity is improved by the joint structure described in Patent Literature 1, further performance improvement is desired. In addition, such performance improvement is similarly desired, not only for car bodies, but also for structure bodies having a similar joint structure.

Thus, the present invention has been made in view of the issue mentioned above, and an object of the present invention is to provide a novel and improved joint structure body that makes it possible to further improve the mechanical properties, in particular the torsional rigidity and the absorbed energy properties in axial crushing, of a joint structure body including a joint formed by joining members.

Solution to Problem

In order to solve the above problems, according to an aspect of the present invention, there is provided a joint structure body of members including a first member, a second member, an end of the second member being thrust against a surface of the first member, and a joint that joins the first member and the second member. The joint includes an end flange that is formed continuously along the end of the second member and of which at least one part overlaps the surface of the first member and a unit joint that joins the end flange and the first member, the end flange is formed continuously to at least one part of the end of the second member via a rising curved surface portion and the rising curved surface portion includes a wall-thickened portion of which a sheet thickness is made larger than a sheet thickness of the second member, and at least one part of the unit joint is provided in a range of 3 mm or less from a boundary between the end flange and the wall-thickened portion.

The second member may have a substantially hat-like or gutter-like cross-sectional shape, the end flange may include a ridge flange formed at an end of a ridge between a web part and a wall part forming the substantially hat-like or gutter-like shape, and the wall-thickened portion may be formed in the rising curved surface portion between the ridge and the ridge flange.

The unit joint may be formed continuously from the end of the ridge to an end of at least one part of the web part and the wall part continuing to the ridge.

The unit joint may be formed continuously over an entire length of one part of the end flange, the part being in contact with the surface of the first member.

Unit joints may be formed intermittently in the end flange, and a length of the unit joints may be a length of 50% or more of an entire length of an area where the end flange and the first member are in contact.

A spot welding portion may be further provided in the joint

The first member may be a floor tunnel or a side sill of an automobile, and the second member may be a floor cross member.

Advantageous Effects of Invention

As described above, by the joint structure body of members of the present invention, it becomes possible to further improve the mechanical properties, in particular the torsional rigidity and the absorbed energy properties in axial crushing.

DESCRIPTION OF EMBODIMENTS

Figure 1:
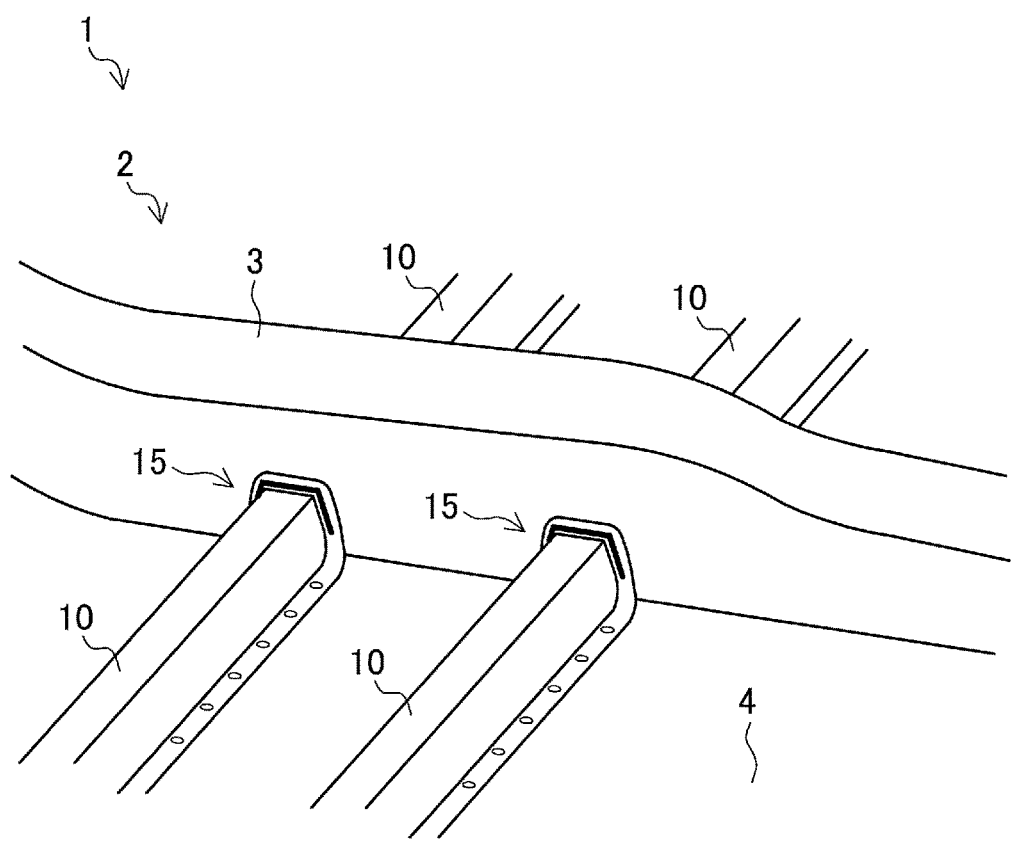
FIG. 1 is a perspective view showing a joint structure body according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<1. Overall Configuration of the Joint Structure Body>

FIG. 1 is an illustration diagram of a joint structure body 1 according to an embodiment of the present invention, and is a perspective view showing a part of a floor 2 of an automobile body as the joint structure body 1. With a tunnel member 3 (floor tunnel) as a first member and a floor cross member 10 as a second member, the joint structure body 1 according to the embodiment has a joint 15 at which an end of the floor cross member 10 is joined to a side surface of the tunnel member 3 so as to be thrust against the side surface in a T-shaped configuration.

For the tunnel member 3 and the floor cross member 10, the material and shape of the parts other than the joint 15 may be a known configuration. In the embodiment, a description is given using the joint structure body 1 having the joint 15 between the tunnel member 3 and the floor cross member 10 as an example; but the joint structure body 1 is not limited to such an example. For example, the embodiment can be applied also to a joint structure body of a side sill (corresponding to the first member) and a floor cross member (corresponding to the second member), a joint structure body of a roof rail (corresponding to the first member) and a roof cross member (corresponding to the second member), a joint structure body of a wheel house (corresponding to the first member) and a rear floor cross member (corresponding to the second member), and a joint structure body of a front side member (corresponding to the first member) and a dash cross member (corresponding to the second member).

<2. Joint>

Figure 2:
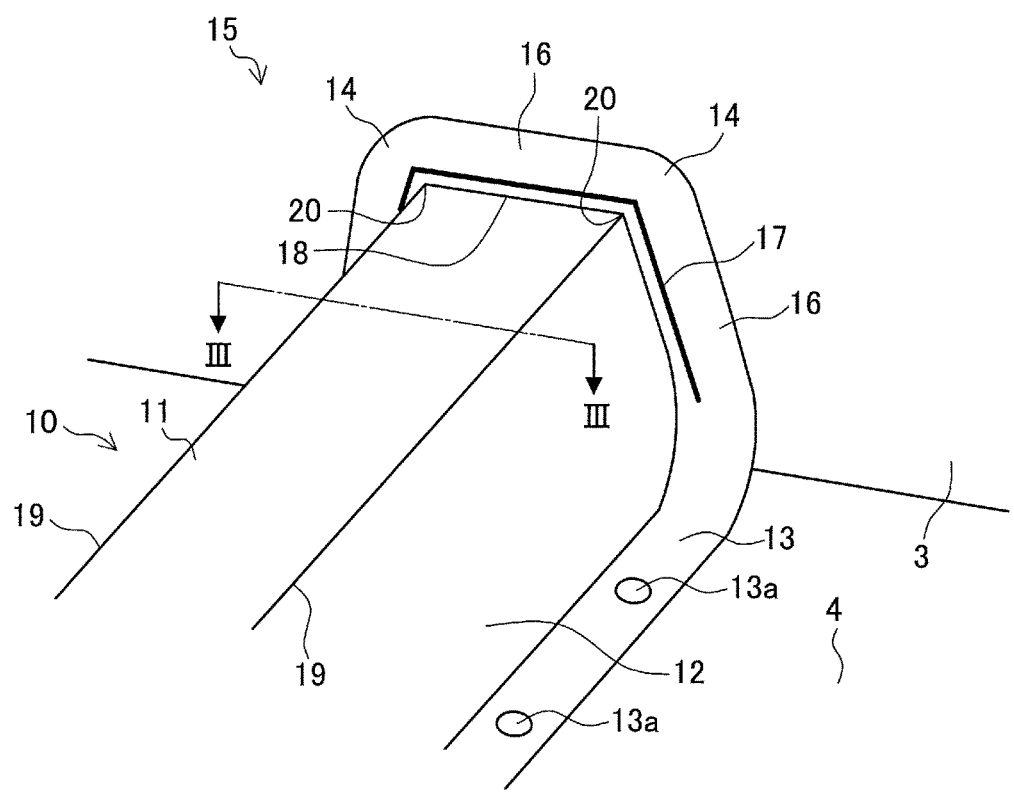
FIG. 2 is an illustration diagram showing an enlarged view of a joint according to the embodiment.
Figure 3:
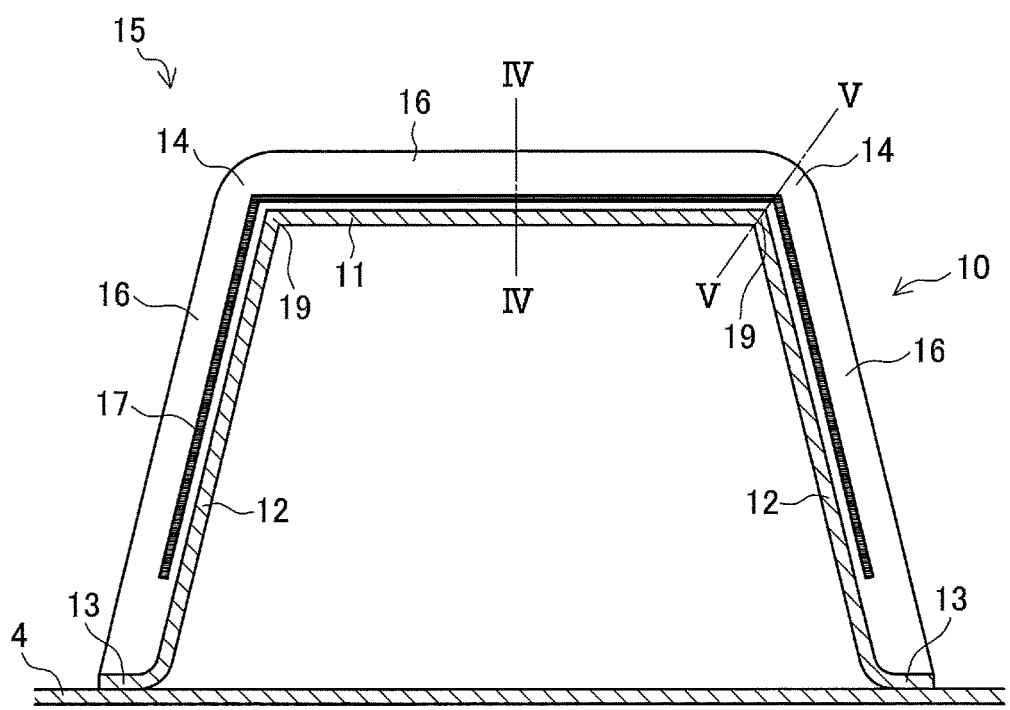
FIG. 3 is a cross-sectional view of a floor cross member.
Figure 4:
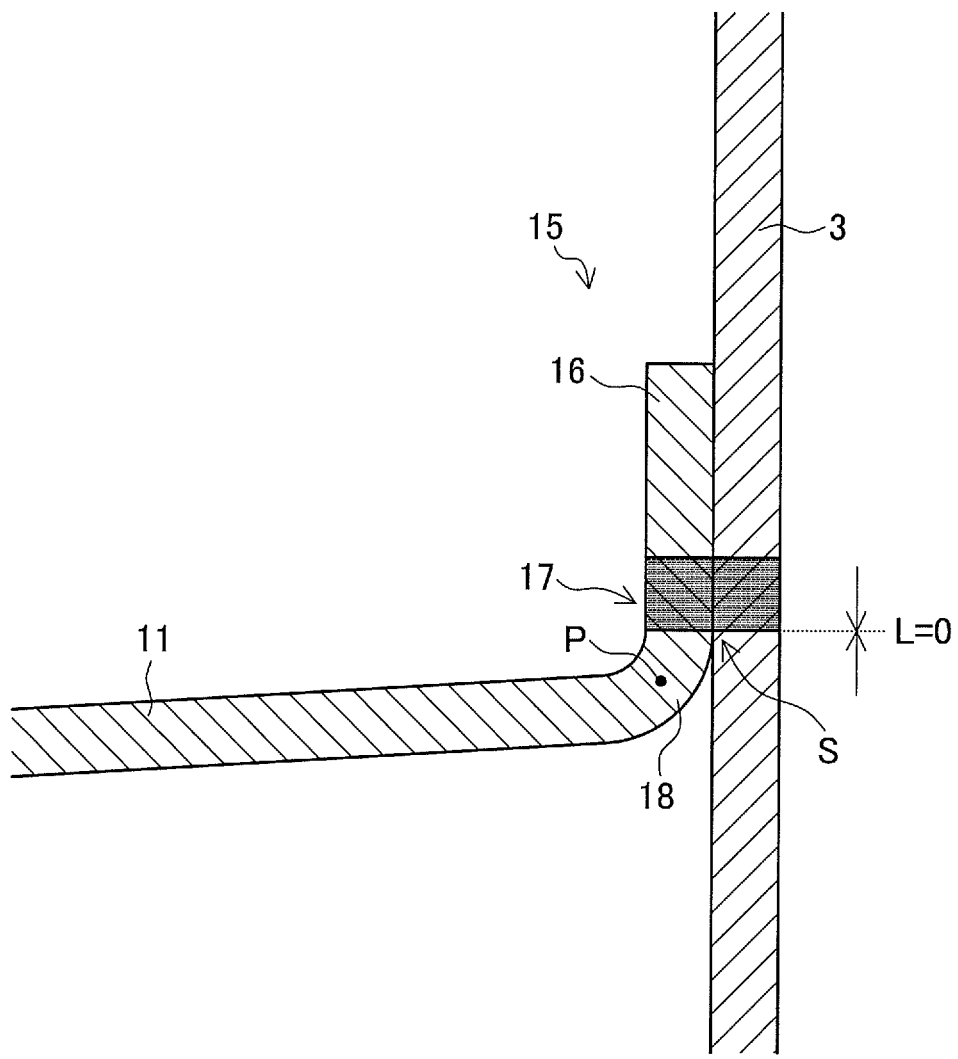
FIG. 4 is an illustration diagram showing a joint.
Figure 5:
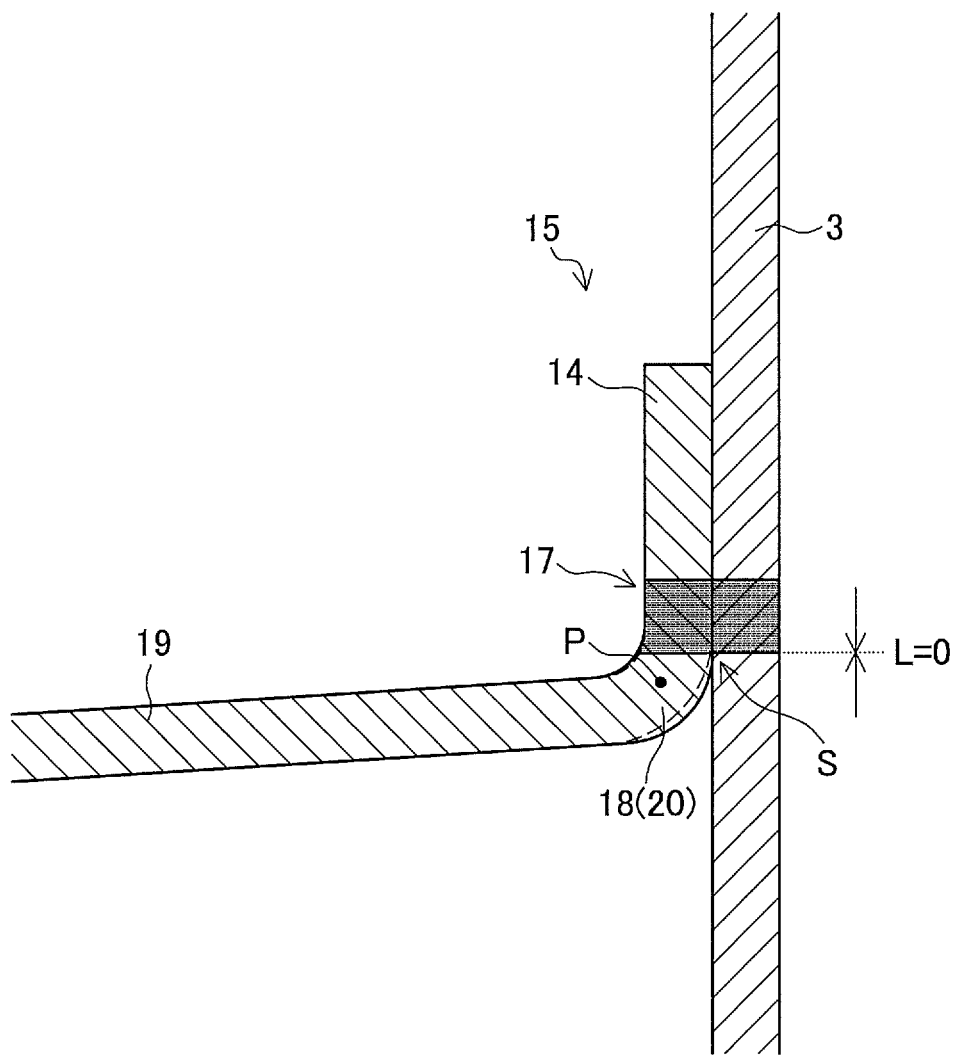
FIG. 5 is an illustration diagram showing a joint including a wall-thickened portion.

FIG. 2 shows an enlarged view of the joint 15 of the joint structure body 1 shown in FIG. 1. FIG. 3 shows a cross-sectional view of the floor cross member 10 taken along line III-III shown in FIG. 2. FIG. 3 is a view of a cross section (hereinafter, occasionally referred to as a "horizontal cross section") orthogonal to the longitudinal direction of the floor cross member 10 (the direction in which the floor cross member 10 extends) as viewed facing the joint 15 side, in which the joint 15 is seen in front. FIG. 4 shows a cross-sectional view of the joint 15 taken along line IV-IV shown in FIG. 3. FIG. 5 shows a cross-sectional view of the joint 15 taken along line V-V shown in FIG. 3.

In the embodiment, the floor cross member 10 has a web part 11 forming the upper surface, wall parts 12 extending from ends of the web part 11 so as to droop down, and a longitudinal flange 13 extending from the end of the wall part 12 on the opposite side to the web part 11. The wall parts 12 are formed continuously to both ends of the web part 11. A ridge 19 is formed between the web part 11 and the wall part 12. The floor cross member 10 is a member having a horizontal cross section of a substantially hat-like shape by means of the web part 11, the ridges 19 continuing to both ends of the web part 11, and the two wall parts 12 continuing further from the ridges 19. The floor cross member 10 is formed by, for example, press molding using a high-tensile steel sheet.

For the longitudinal direction of the floor cross member 10, as shown in FIG. 2, spot welding portions 13a are formed in the longitudinal flange 13, and the floor cross member 10 is joined to a floor member 4 by spot welding. The joining of the longitudinal flange 13 to the floor member 4 may be performed by weld bonding using spot welding in combination with an adhesive or by laser welding.

On the other hand, in the joint structure body 1 including the floor cross member 10, the joint 15 to the tunnel member 3 is formed at an end in the longitudinal direction of the floor cross member 10. The joint 15 has an end flange 16 formed at the end in the longitudinal direction of the floor cross member 10 and a unit joint 17 that joins the floor cross member 10 and the tunnel member 3 via the end flange 16. The unit joint 17 is one part that actually joins the end flange 16 and the tunnel member 3.

In the embodiment, the end flange 16 is a flange formed at ends in the longitudinal direction of the web part 11, the ridge 19, and the wall part 12, and is formed continuously along the web part 11, the ridge 19, and the wall part 12. The end flange 16 like this includes a ridge flange 14 formed at the end of the ridge 19. The end flange 16 is formed continuously to the web part 11, the ridge 19, and the wall part 12 via a rising curved surface portion 18.

In the embodiment, the unit joint 17 based on welding is provided over the entire length of the part in contact with the tunnel member 3 of the end flange 16. That is, of the end flange 16 shown in FIG. 3, in the part where the unit joint 17 is not formed, the end flange 16 is apart from the tunnel member 3 (see FIG. 2). The unit joint 17 like this is provided in a position adjacent to the boundary portion S between the end flange 16 and the rising curved surface portion 18.

The method of welding is not particularly limited, but is preferably a welding method in which welding can be performed continuously while the joint structure body 1 is moved relatively, such as laser welding, laser arc hybrid welding, laser brazing, or arc welding. Laser arc hybrid welding in which the tolerance to the gap is high and high-speed welding is possible may preferably be used.

Here, the floor cross member 10 is formed by, for example, performing pressing such as bending or drawing on a blank material. At this time, the ridge 19 is formed by, after or while bending an end of the blank material which forms the end flange 16, bending the blank material, with the surface on the opposite side to the bending direction of the end flange 16 set inside. To enhance the mechanical properties of the joint structure body 1 of the floor cross member 10 and the tunnel member 3, the unit joint 17 is preferably formed in a position near the rising curved surface portion 18, that is, so as to include or be adjacent to the boundary portion S between the rising curved surface portion 18 and the end flange 16. To this end, it is desired to reduce the curvature radius Rf of the rising curved surface portion 18 at the root portion of the end flange 16.

However, the smaller the curvature radius Rf of the rising curved surface portion 18 is designed, the more likely it is that, when the blank material is bent along the ridge 19, cracking will occur at the end of the ridge flange 14 on the opposite side to the rising curved surface portion 18 side, or large wrinkling will occur in the rising curved surface portion 18 at the root of the ridge flange 14. Such cracking and large wrinkling are more likely to occur, when the sheet thickness of the blank material is larger or the tension of the blank material is larger. Therefore, in the case where the end flange 16 including the ridge flange 14 is formed at the end of the floor cross member 10, it is difficult to reduce the curvature radius Rf of the rising curved surface portion 18 to the limit.

In FIG. 4, a situation in which, at the end of the web part 11, the end flange 16 is formed continuously to the web part 11 via the rising curved surface portion 18 is shown. In the joint 15 at the end of the web part 11, one surface of the end flange 16 is placed to overlap the joining target surface of the tunnel member 3, and at least one part of the one surface is in contact with the tunnel member 3. In the example shown in FIG. 4, the entire one surface of the end flange 16 excluding the rising curved surface portion 18 is in contact with the tunnel member 3. The unit joint 17 is provided adjacent to the boundary portion S between the rising curved surface portion 18 and the end flange 16.

When the end flange 16 is formed by simply bending the blank material, it is likely that elongation of the blank material will occur in the portion to be formed into the rising curved surface portion 18, and the sheet thickness will become smaller than the sheet thickness of the blank material. That is, a tendency in which the sheet thickness of the rising curved surface portion 18 formed at the end of the web part 11 and the end of the wall part 12 is reduced with respect to the sheet thickness of the blank material is seen. Although not illustrated, also at the end of the wall part 12, the unit joint 17 is provided adjacent to the boundary portion S between the rising curved surface portion 18 and the end flange 16 as shown in FIG. 4.

FIG. 5 shows a situation in which, at the end of the ridge 19, the ridge flange 14 is formed continuously to the ridge 19 via the rising curved surface portion 18. Also in the joint 15 at the end of the ridge 19, one surface of the ridge flange 14 is placed to overlap the joining target surface of the tunnel member 3, and at least one part of the one surface is in contact with the tunnel member 3. In the example shown in FIG. 5, the entire one surface of the ridge flange 14 excluding the rising curved surface portion 18 is in contact with the tunnel member 3. At this time, the rising curved surface portion 18 formed at the end of the ridge 19 is formed as a wall-thickened portion 20 of which the sheet thickness is made larger than the sheet thickness of the blank material for forming the floor cross member 10.

In the rising curved surface portion 18 formed at the root of the ridge flange 14, the material of the blank material flows in or wrinkling occurs, and thereby the sheet thickness becomes larger than the sheet thickness of the blank material. In FIG. 5, a situation in which the sheet thickness is increased with respect to the sheet thickness of the original blank material (broken line) is shown. The larger the rate of wall thickening that indicates the ratio of the thickness of the wall-thickened portion 20 to the sheet thickness of the blank material is, the smaller the curvature radius Rf in the wall-thickened portion 20 is. As described above, to prevent cracking at the end of the ridge flange 14 and large wrinkling at the root portion, although there is a limit to reduce the curvature radius Rf of the rising curved surface portion 18 at the root of the end flange 16, the wall-thickened portion 20 is formed at the root portion of the ridge flange 14. Therefore, the curvature radius Rf of the wall-thickened portion 20 becomes smaller than those of other portions.

Thus, by providing the unit joint 17 in such a manner that the unit joint 17 includes the boundary portion S between the wall-thickened portion 20 like this and the ridge flange 14 or is adjacent to the boundary portion S, the unit joint 17 is placed in a position nearer to the center position P of the bending of the rising curved surface portion 18. Thereby, the mechanical properties of the joint structure body 1 of the floor cross member 10 and the tunnel member 3 are improved. In particular, the ridge 19, which is a bent portion located between the web part 11 and the wall part 12, is a portion in charge of the load when a collision load is inputted in the axial direction. Thus, by the unit joint 17 being provided adjacent to the wall-thickened portion 20 at the end of the ridge 19 in the rising curved surface portion 18, the collision load is transferred to the ridge 19 efficiently, and the absorbed energy efficiency can be further improved.

Figure 6:
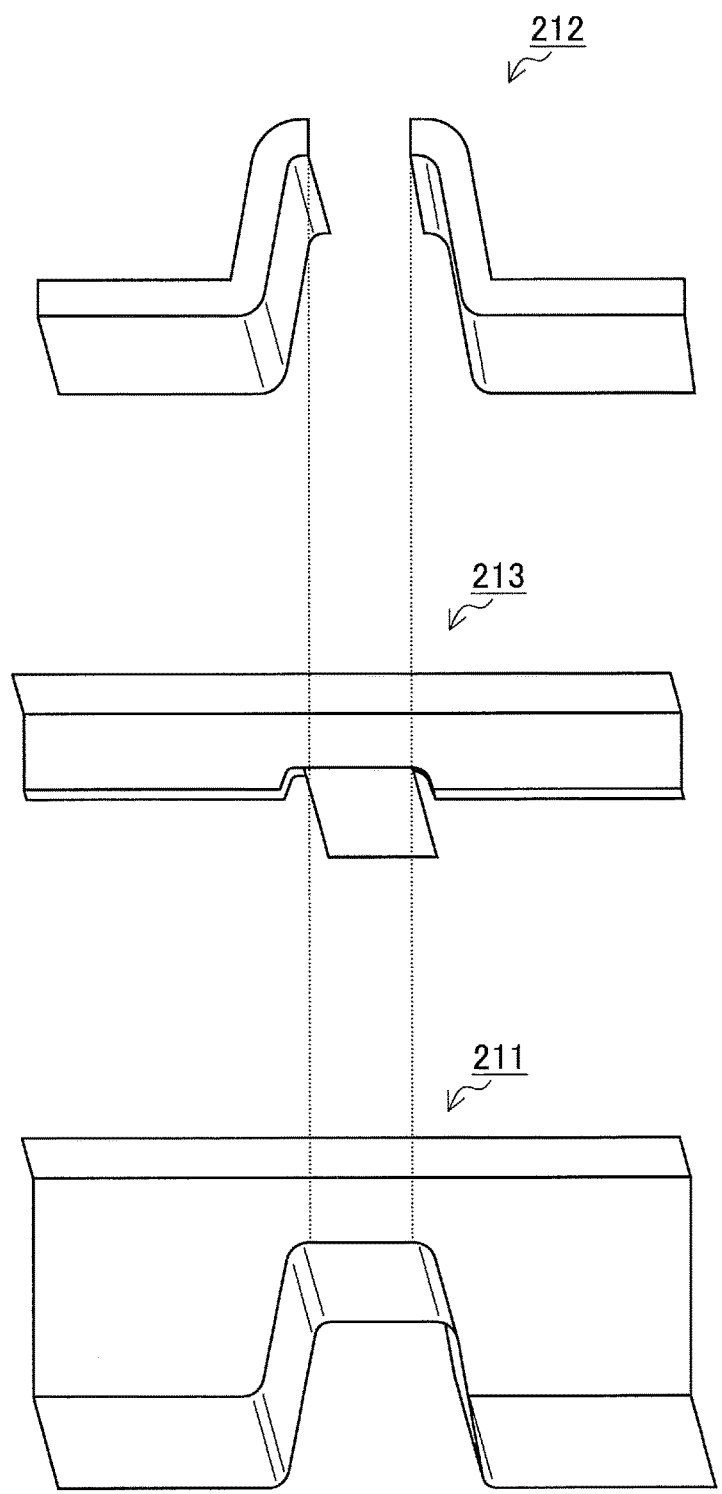
FIG. 6 is an illustration diagram showing an example of a press molding apparatus.
Figure 7:
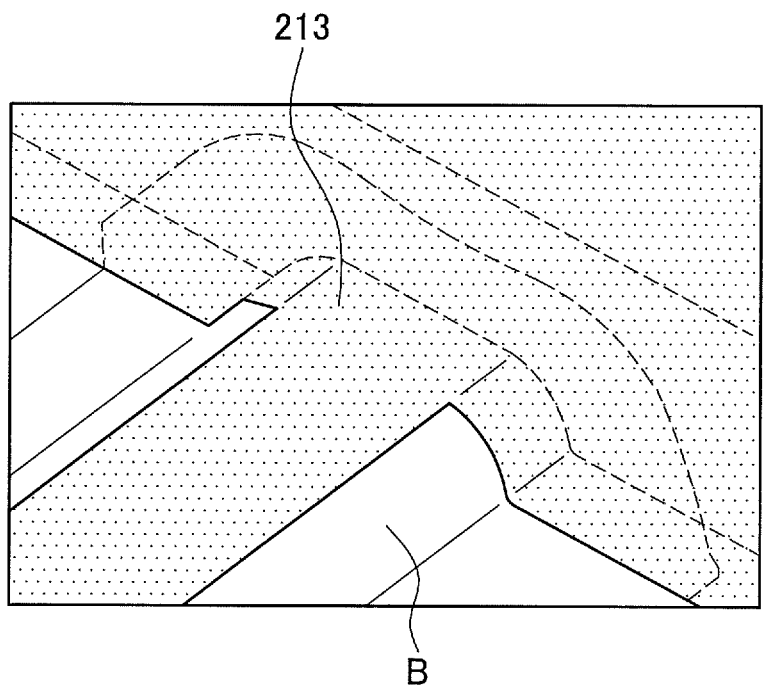
FIG. 7 is an illustration diagram showing a situation of press molding.

FIG. 6 and FIG. 7 are diagrams for describing an example of the press molding that molds the floor cross member 10 having the end flange 16 formed continuously from the web part 11 through the ridge 19 to the wall part 12. FIG. 6 is a perspective view showing a punch 211, a die 212, and a ridge pushing pad 213 of a press molding apparatus, and FIG. 7 is a perspective view showing a situation in which a blank material B is pressed against the punch 211 by the ridge pushing pad 213.

In such an example, as shown in FIG. 7, the blank material B is bent by the die 212 in a state where the blank material B is pressed against the punch 211 by the ridge pushing pad 213 and the ends of the portion to be molded into the web part 11 and the portion to be molded into the ridge 19 are restrained. Thereby, the end flange 16 including the ridge flange 14 is formed while the curvature radius Rf of the rising curved surface portion 18 is reduced and the cracking at the end of the ridge flange 14 on the opposite side to the rising curved surface portion 18 side is suppressed.

At this time, in the rising curved surface portion 18 at the end of the ridge 19, although the occurrence of significant wrinkling is suppressed, the sheet thickness is increased due to the inflow of the material of the blank material B and the occurrence of wrinkling, and the wall-thickened portion 20 is formed. In the wall-thickened portion 20 like this, the curvature radius Rf of the rising curved surface portion 18 is small as compared to portions not wall-thickened.

Thereby, the boundary portion S between the rising curved surface portion 18 and the ridge flange 14 is brought closer to the center position P of bending.

Figure 8:
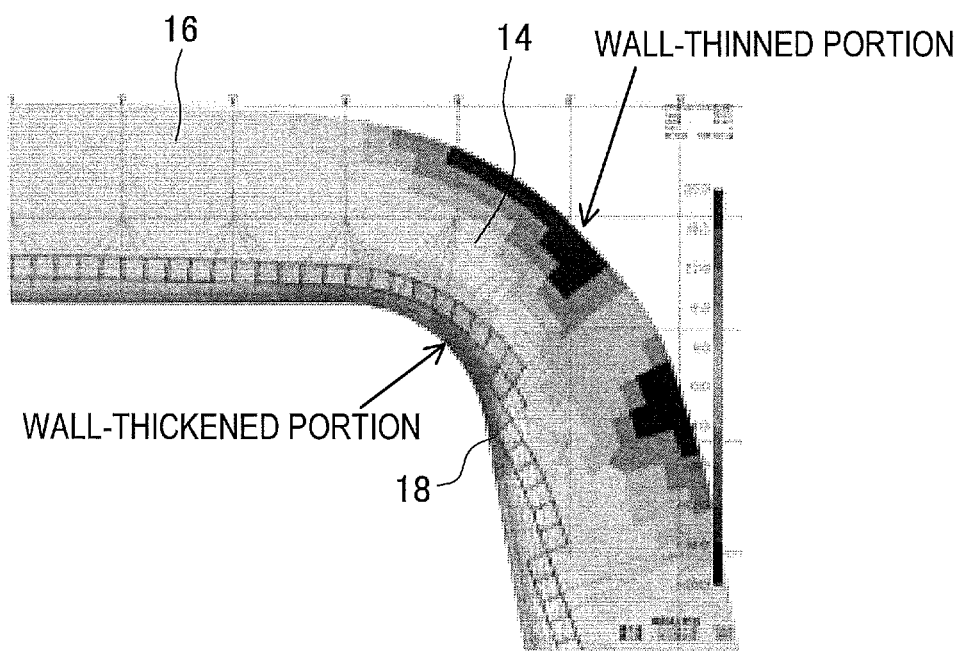
FIG. 8 is an illustration diagram showing a sheet thickness distribution of a ridge flange and a rising curved surface portion.

FIG. 8 is a contour figure showing the sheet thickness distribution of the end flange 16 including the ridge flange 14 and the rising curved surface portion 18. As shown in FIG. 8, the sheet thickness of the end of the ridge flange 14 on the opposite side to the rising curved surface portion 18 side is reduced; on the other hand, the sheet thickness of the rising curved surface portion 18 at the root portion of the ridge flange 14 is increased.

Figure 9:
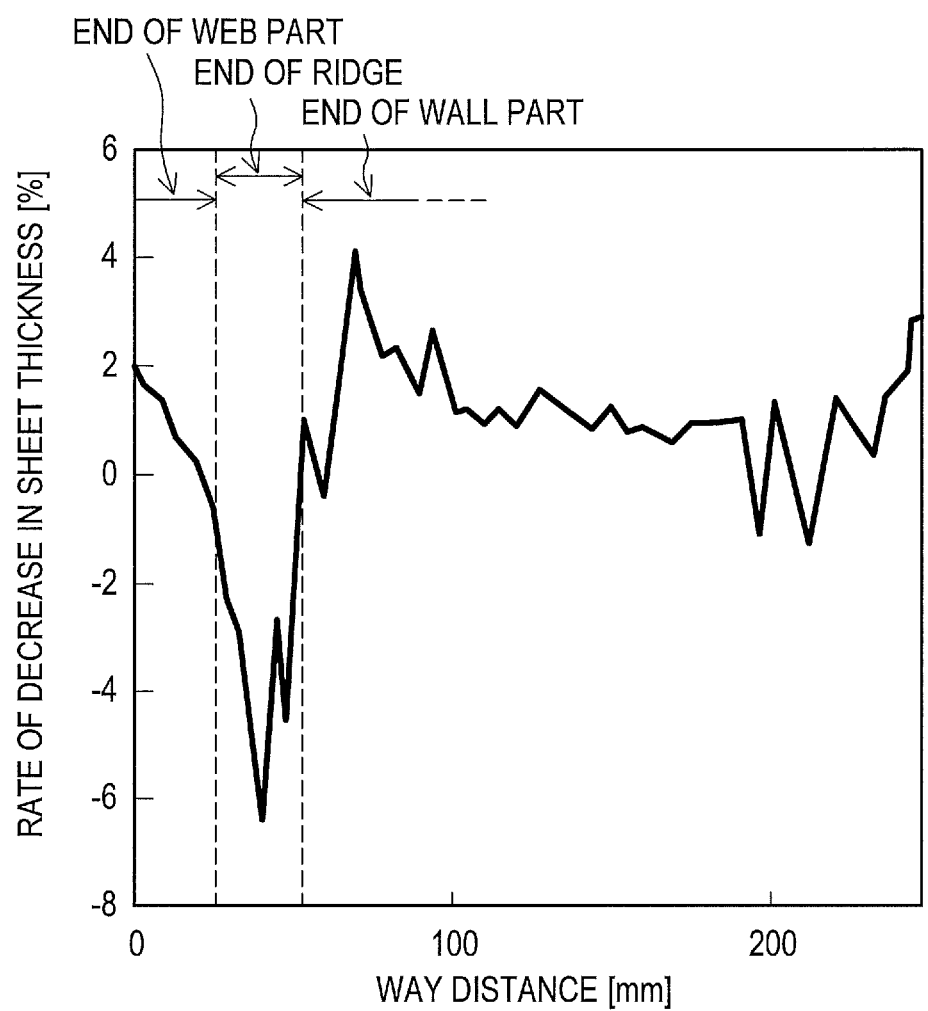
FIG. 9 is an illustration diagram showing a sheet thickness distribution of a rising curved surface portion.

FIG. 9 is a graph in which the rate of decrease in the sheet thickness (%) of the ends of the web part 11, the ridge 19, and the wall part 12 is shown along the distance of the way from the web part 11 through the ridge 19 to the wall part 12. The ends of the web part 11, the ridge 19, and the wall part 12 correspond to the rising starting position of the rising curved surface portion 18. The case where the rate of decrease in the sheet thickness (%) shows a negative value indicates that the sheet thickness is increased. As shown in FIG. 9, it can be seen that, at the ends of the web part 11 and the wall part 12, the rate of decrease in the sheet thickness (%) is generally positive values and the sheet thickness is reduced; on the other hand, at the end of the ridge 19, the rate of decrease in the sheet thickness (%) is negative values and the sheet thickness is increased.

That is, in the joint structure body 1 according to the embodiment, at least one part of the unit joint 17 is formed adjacent to the boundary portion S between the wall-thickened portion 20 of the rising curved surface portion 18 and the ridge flange 14. As described above, in the wall-thickened portion 20, the curvature radius Rf of the rising curved surface portion 18 is small as compared to other portions; and the ridge flange 14 is in contact with the tunnel member 3 in a position near the center position P of the bending of the rising curved surface portion 18. Thus, by the unit joint 17 being provided adjacent to the boundary portion S between the ridge flange 14 and the wall-thickened portion 20, the ridge flange 14 and the tunnel member 3 are joined in a position nearer to the end of the ridge 19.

The unit joint 17 that joins the end flange 16 including the ridge flange 14 and the tunnel member 3 is provided so as to include a range of 3 mm or less from the boundary portion S between the end flange 16 and the rising curved surface portion 18. That is, in the case where the end flange 16 is configured so as to be in surface contact with the tunnel member 3, the unit joint 17 is formed such that at least one part of the unit joint 17 is included in a range of 3 mm or less from the part where the end flange 16 first comes into contact with the tunnel member 3 on the rising curved surface portion 18 side. In the examples of FIG. 4 and FIG. 5, the distance L from the boundary portion S between the end flange 16 or the ridge flange 14 and the rising curved surface portion 18 to the unit joint 17 is 0 mm.

Thereby, the torsional rigidity and the absorbed energy properties in axial crushing of the joint structure body 1 can be improved reliably. As illustrated later, the unit joint 17 may be placed nearer to the side of the web part 11, the ridge 19, and the wall part 12, than to the boundary portion S between the rising curved surface portion 18 and the end flange 16 or the ridge flange 14. By the unit joint 17 being placed in such a position, the torsional rigidity and the absorbed energy properties in axial crushing can be improved stably. In particular, by the unit joint 17 being provided adjacent to the wall-thickened portion 20 at the end of the ridge 19 in the rising curved surface portion 18, the collision load is transferred to the ridge 19 efficiently, and the absorbed energy efficiency can be further improved.

In the case where the floor cross member 10 and the tunnel member 3 are joined by welding, welding may be performed from the end flange 16 side, or welding may be performed from the tunnel member 3 side. As the welding method in this case, laser arc hybrid welding is preferable.

As described above, in the joint structure body 1 according to the embodiment, the unit joint 17 is provided so as to include at least a range of 3 mm or less from the boundary portion S between the end flange 16 or the ridge flange 14 and the rising curved surface portion 18. Therefore, the floor cross member 10 and the tunnel member 3 are joined near the position where the end flange 16 and the ridge flange 14 first come into contact with the tunnel member 3 on the rising curved surface portion 18 side, and the torsional rigidity and the absorbed energy properties in axial crushing of the joint structure body 1 can be improved.

Furthermore, in the joint structure body 1 according to the embodiment, the unit joint 17 is provided to include a range of 3 mm or less from the boundary portion S between the wall-thickened portion 20 formed at the end of the ridge 19 in the rising curved surface portion 18 and the ridge flange 14. Therefore, the load is efficiently transferred to the ridge 19, which is in charge of the collision load in the axial direction, and the absorbed energy properties in axial crushing are further improved.

<3. Modification Examples>

Hereinabove, the joint structure body 1 according to an embodiment is described; but the configuration of the joint 15 is not limited to the example of the embodiment described above. Some modification examples of the joint will now be described. The configuration of the portions other than the joint may be a similar configuration to the embodiment described above, and herein only the joint is described.

(3-1. First Modification Example)

Figure 10:
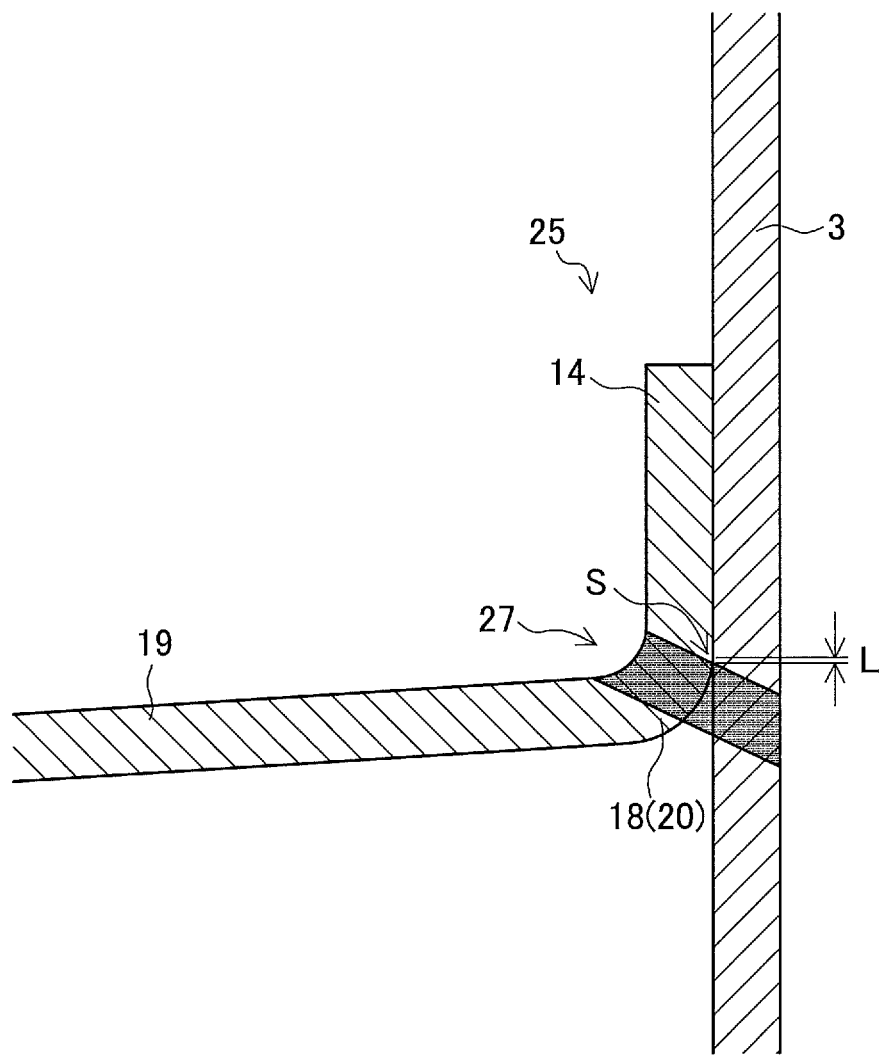
FIG. 10 is an illustration diagram showing a joint according to a first modification example.

FIG. 10 is a diagram showing a joint 25 according to a first modification example, and shows a cross-sectional view of the joint 25. FIG. 10 is a diagram corresponding to FIG. 5, and shows a cross-sectional view of the joint portion between the ridge flange 14 and the tunnel member 3.

The joint 25 according to the first modification example is an example in which a unit joint 27 is formed in the wall-thickened portion 20 adjacent to the boundary portion S between the wall-thickened portion 20 and the ridge flange 14. Although not illustrated, also at the ends of the web part 11 and the wall part 12, the unit joint 27 may be formed in the rising curved surface portion 18 adjacent to the boundary portion S between the rising curved surface portion 18 and the end flange 16.

Also in the joint 25 like this, the unit joint 27 is provided in a range in which the distance L from the boundary portion S between the wall-thickened portion 20 with its curvature radius Rf reduced and the ridge flange 14 is 3 mm or less. Thereby, the torsional rigidity and the absorbed energy properties of axial crushing of the joint structure body 1 are improved. In particular, since the unit joint 27 is formed by utilizing the wall-thickened portion 20 formed at the end of the ridge 19 in charge of the collision load, the collision load is transferred to the ridge 19 efficiently, and the absorbed energy properties of axial crushing can be improved.

Furthermore, in the joint 25 according to the first modification example, since the unit joint 27 is formed at the position of the rising curved surface portion 18, the floor cross member 10 and the tunnel member 3 are joined on the extension lines of the web part 11, the ridge 19, and the wall part 12. In the joint 25, since the floor cross member 10 and the tunnel member 3 are joined on the extension line of the ridge 19, the collision load is transferred to the ridge 19 efficiently. Therefore, the torsional rigidity and the absorbed energy properties of axial crushing of the joint structure body 1 are further improved.

(3-2. Second Modification Example)

Figure 11:
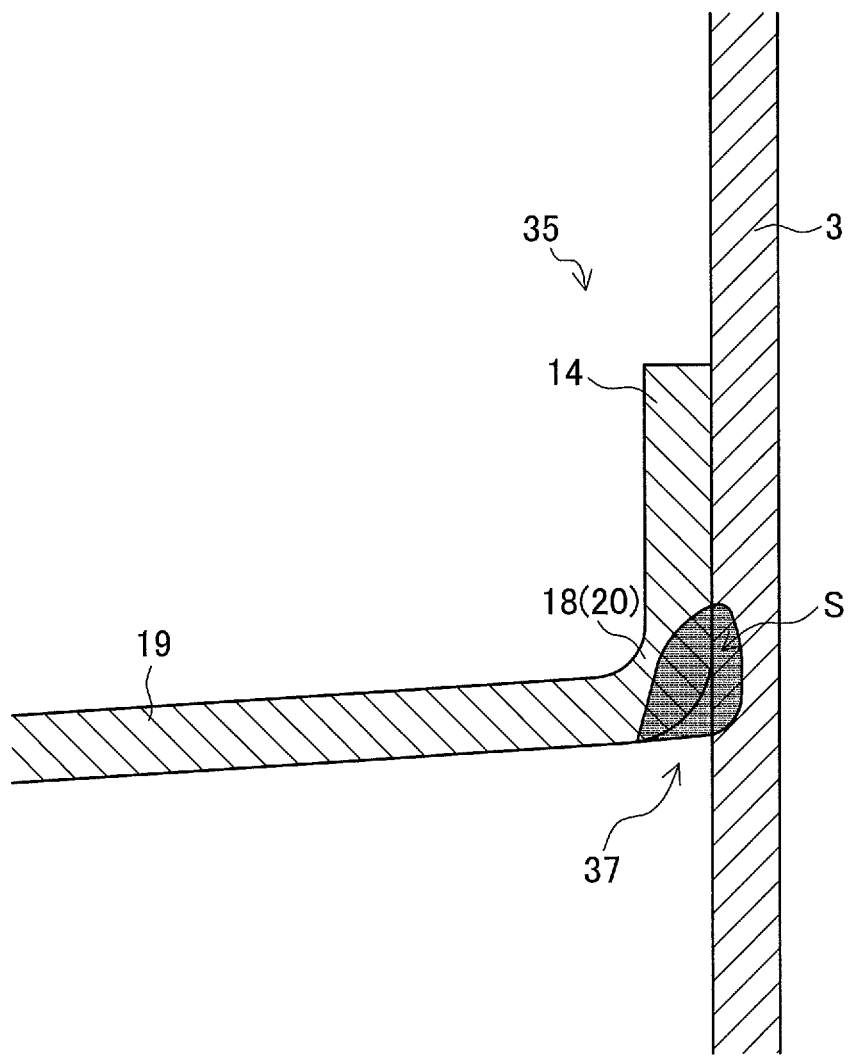
FIG. 11 is an illustration diagram showing a joint according to a second modification example.

FIG. 11 is a diagram showing a joint 35 according to a second modification example, and shows a cross-sectional view of the joint 35. FIG. 11 is a diagram corresponding to FIG. 5, and shows a cross-sectional view of the joint portion between the ridge flange 14 and the tunnel member 3.

The joint 35 according to the second modification example is an example in which a unit joint 37 is provided in the inside portion sandwiched by the floor cross member 10 and the tunnel member 3, across the boundary portion S between the wall-thickened portion 20 and the ridge flange 14. Although not illustrated, also at the ends of the web part 11 and the wall part 12, the unit joint 37 may be formed in the inside portion sandwiched by the floor cross member 10 and the tunnel member 3, across the boundary portion S between the rising curved surface portion 18 and the end flange 16.

In the joint 35 like this, the unit joint 37 is provided so as to include the boundary portion S between the wall-thickened portion 20 with its curvature radius Rf reduced and the ridge flange 14. That is, the distance L from the boundary portion S between the wall-thickened portion 20 and the ridge flange 14 to the unit joint 37 is 0 mm. Thereby, the torsional rigidity and the absorbed energy properties of axial crushing of the joint structure body 1 are improved. In particular, since the unit joint 37 is formed by utilizing the wall-thickened portion 20 formed at the end of the ridge 19 in charge of the collision load, the collision load is transferred to the ridge 19 efficiently, and the absorbed energy properties of axial crushing are improved.

Furthermore, in the joint 35 according to the second modification example, since the unit joint 37 is formed at the position of the rising curved surface portion 18, the floor cross member 10 and the tunnel member 3 are joined on the extension lines of the web part 11, the ridge 19, and the wall part 12. In the joint 35, since the floor cross member 10 and the tunnel member 3 are joined on the extension line of the ridge 19, the collision load is transferred to the ridge 19 efficiently. Therefore, the torsional rigidity and the absorbed energy properties of axial crushing of the joint structure body 1 are further improved.

(3-3. Third Modification Example)

Figure 12:
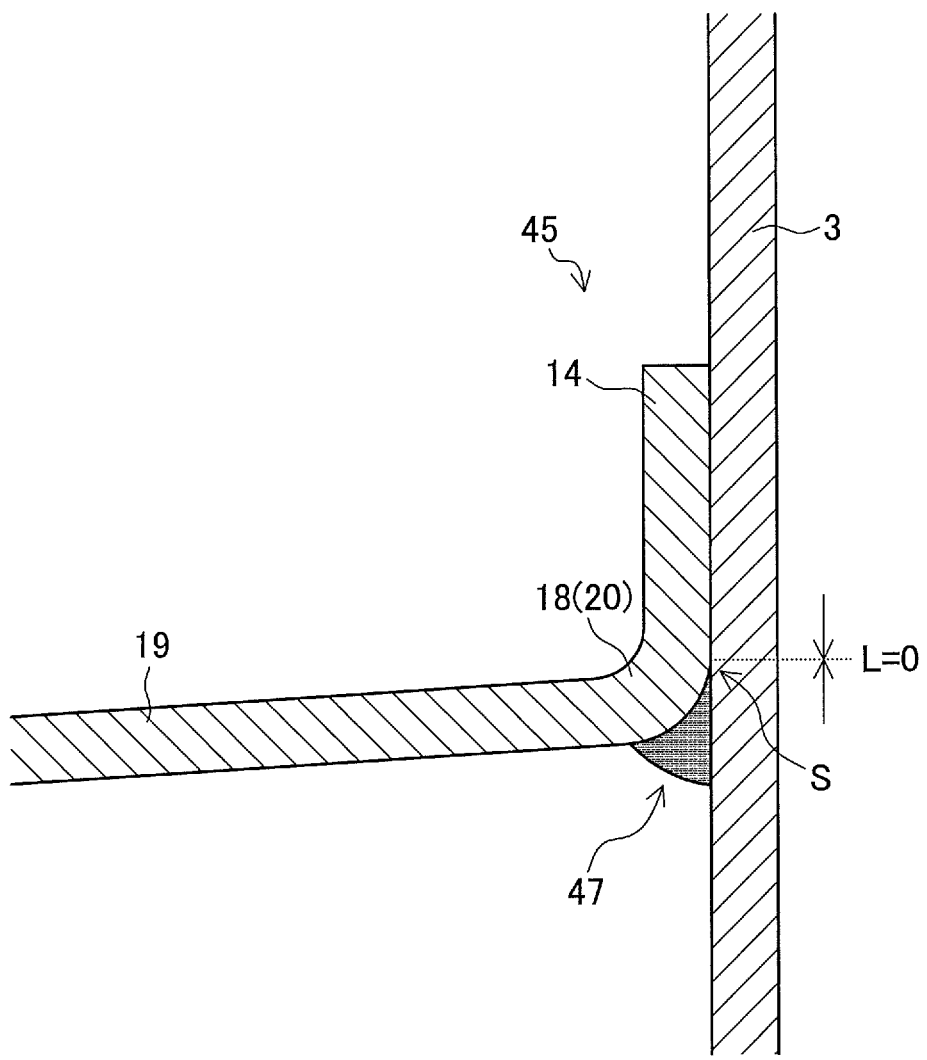
FIG. 12 is an illustration diagram showing a joint according to a third modification example.

FIG. 12 is a diagram showing a joint 45 according to a third modification example, and shows a cross-sectional view of the joint 45. FIG. 12 is a diagram corresponding to FIG. 5, and shows a cross-sectional view of the joint portion between the ridge flange 14 and the tunnel member 3.

The joint 45 according to the third modification example is an example in which a unit joint 47 is formed by brazing. The unit joint 47 based on brazing like this is formed in the inside portion sandwiched by the rising curved surface portion 18 and the tunnel member 3, and the unit joint 47 is provided adjacent to the boundary portion S between the rising curved surface portion 18 and the ridge flange 14. Although not illustrated, also at the ends of the web part 11 and the wall part 12, the unit joint 47 based on brazing may be formed in the inside portion sandwiched by the rising curved surface portion 18 and the tunnel member 3.

In the joint 45 like this, the unit joint 47 is provided in a range in which the distance L from the boundary portion S between the wall-thickened portion 20 with its curvature radius Rf reduced and the ridge flange 14 is 3 mm or less. In FIG. 12, the distance L is 0 mm. Thereby, the torsional rigidity and the absorbed energy properties of axial crushing of the joint structure body 1 are improved. In particular, since the unit joint 47 is formed by utilizing the wall-thickened portion 20 formed at the end of the ridge 19 in charge of the collision load, the collision load is transferred to the ridge 19 efficiently, and the absorbed energy properties of axial crushing are improved.

Furthermore, in the joint 45 according to the third modification example, since the unit joint 27 is formed at the position of the rising curved surface portion 18, the floor cross member 10 and the tunnel member 3 are joined on the extension lines of the web part 11, the ridge 19, and the wall part 12. In the joint 45, since the floor cross member 10 and the tunnel member 3 are joined on the extension line of the ridge 19, the collision load is transferred to the ridge 19 efficiently. Therefore, the torsional rigidity and the absorbed energy properties of axial crushing of the joint structure body 1 are further improved.

(3-4. Fourth Modification Example)

Figure 13:
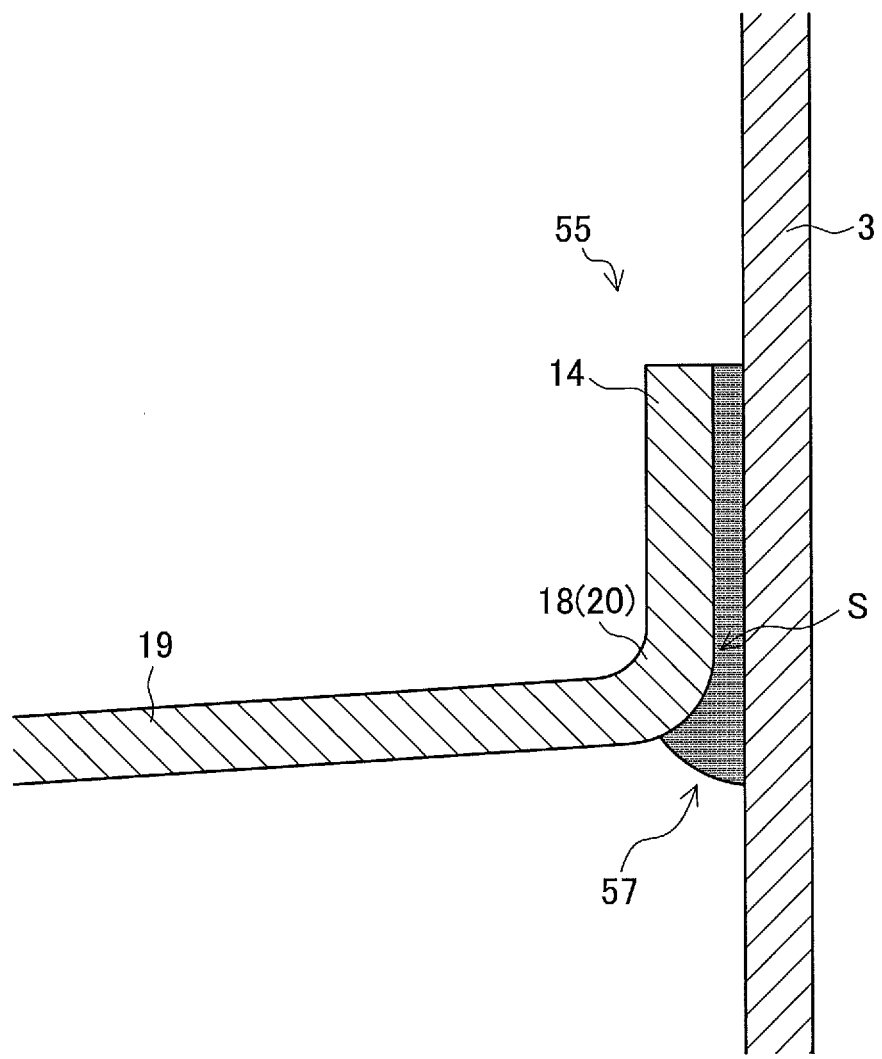
FIG. 13 is an illustration diagram showing a joint according to a fourth modification example.

FIG. 13 is a diagram showing a joint 55 according to a fourth modification example, and shows a cross-sectional view of the joint 55. FIG. 13 is a diagram corresponding to FIG. 5, and shows a cross-sectional view of the joint portion between the ridge flange 14 and the tunnel member 3.

The joint 55 according to the fourth modification example is an example in which a unit joint 57 is formed by sticking with an adhesive. The unit joint 57 based on an adhesive like this is formed over the area where the rising curved surface portion 18 and the ridge flange 14, and the tunnel member 3 face each other, and the unit joint 57 is provided to include the boundary portion S between the rising curved surface portion 18 and the ridge flange 14. That is, the distance L from the boundary portion S between the wall-thickened portion 20 and the ridge flange 14 to the unit joint 57 is 0 mm. Although not illustrated, also at the ends of the web part 11 and the wall part 12, the unit joint 57 based on an adhesive may be formed in the area where the rising curved surface portion 18 and the end flange 16, and the tunnel member 3 face each other.

In the joint 55 like this, the unit joint 57 is provided so as to include the boundary portion S between the wall-thickened portion 20 with its curvature radius Rf reduced and the ridge flange 14. Thereby, the torsional rigidity and the absorbed energy properties of axial crushing of the joint structure body 1 are improved. In particular, since the unit joint 57 is formed by utilizing the wall-thickened portion 20 formed at the end of the ridge 19 in charge of the collision load, the collision load is transferred to the ridge 19 efficiently, and the absorbed energy properties of axial crushing are improved.

Furthermore, in the joint 55 according to the fourth modification example, since the unit joint 27 is formed at the position of the rising curved surface portion 18, the floor cross member 10 and the tunnel member 3 are joined on the extension lines of the web part 11, the ridge 19, and the wall part 12. In the joint 55, since the floor cross member 10 and the tunnel member 3 are joined on the extension line of the ridge 19, the collision load is transferred to the ridge 19 efficiently. Therefore, the torsional rigidity and the absorbed energy properties of axial crushing of the joint structure body 1 are further improved.

(3-5. Fifth Modification Example)

Figure 14:
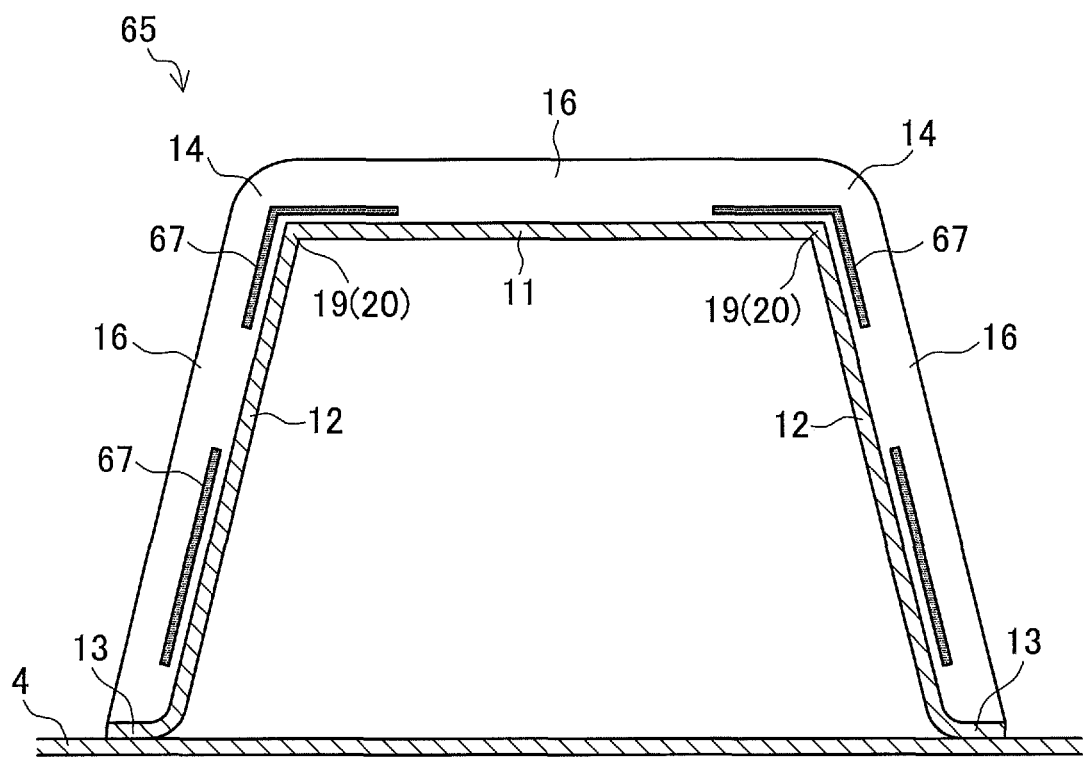
FIG. 14 is an illustration diagram showing a joint according to a fifth modification example.

FIG. 14 is a diagram showing a joint 65 according to a fifth modification example, and shows a view of the joint 65 in a planar view. FIG. 14 is a diagram corresponding to FIG.

3, and is a view of a horizontal cross section of the floor cross member 10 as viewed facing the joint 65 side.

In the joint 65 according to the fifth modification example, unit joints 67 are formed intermittently. The unit joint 67 is formed so as to include a range in which the distance L from the boundary portion S between the wall-thickened portion 20 at the end of the ridge 19 and the ridge flange 14 is 3 mm or less. Thus, the unit joint 67 does not need to be formed continuously over the entire length of the part in contact with the tunnel member 3 of the end flange 16 including the ridge flange 14, and may be formed intermittently. The unit joints 67 are preferably formed such that the total length of the unit joints 67 is 50% or more of the entire length of the portion in contact with the tunnel member 3 of the end flange 16. As the specific configuration of the unit joint 67, the configuration of the unit joint according to each embodiment and each modification example described above may be selected as appropriate.

(3-6. Sixth Modification Example)

Figure 15:
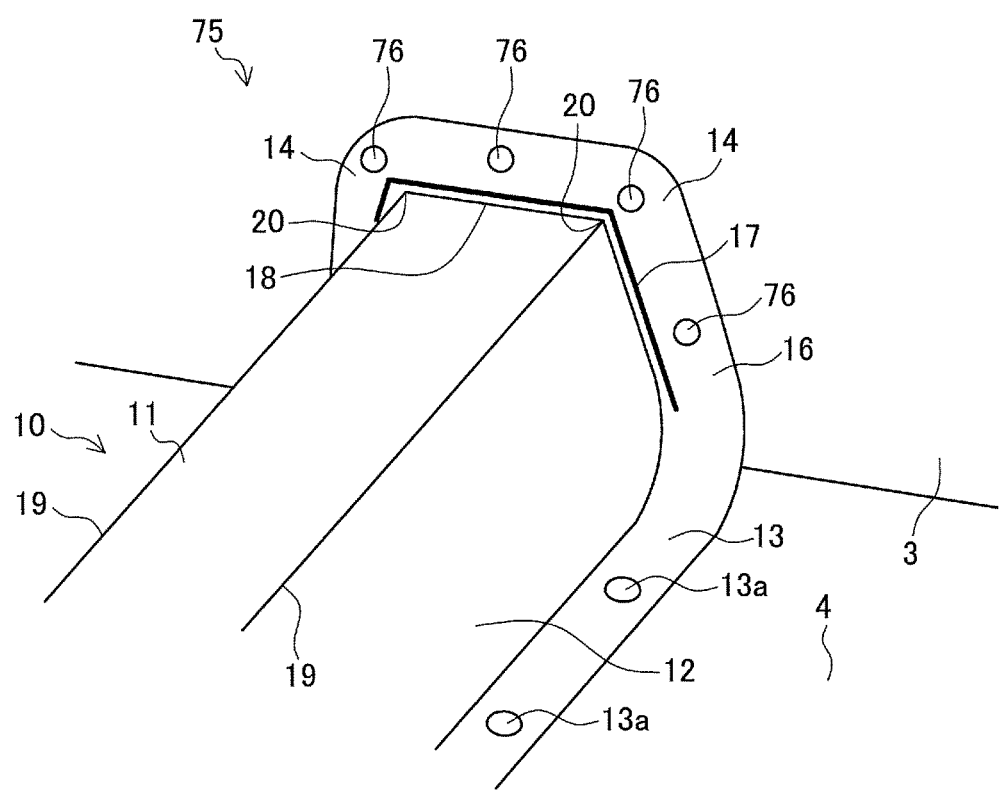
FIG. 15 is an illustration diagram showing a joint according to a sixth modification example.

FIG. 15 is a diagram showing a joint 75 according to a sixth modification example. FIG. 15 is a diagram corresponding to FIG. 2, and shows a perspective view of the joint 75.

The joint 75 according to the sixth modification example is a joint in which the joint 15 of the joint structure body 1 according to the embodiment described above is further provided with spot welding portions 76. In the joint 75 according to the sixth modification example, first, the end flange 16 and the tunnel member 3 are fixed by the spot welding portions 76, and therefore the shape is stabilized. Thereby, a unit joint 77 can easily be provided adjacent to the boundary portion S between the rising curved surface portion 18 and the end flange 16, and furthermore the deformation when a bending load is applied to the joint 75 can be suppressed to a low level. In this case, by providing the ridge flange 14 with the spot welding portion 76, the collision load can be transferred to the ridge more efficiently, and the absorbed energy properties of axial crushing can be improved. As the configuration of the unit joint 77, the configuration of the unit joint according to each embodiment and each modification example described above may be selected as appropriate.

Also by the joint structure body having the joint according to each modification example described above, the torsional rigidity and the absorbed energy properties in axial crushing can be improved.

Hereinabove, preferred embodiments of the present invention are described in detail with reference to the appended drawings; however, the present invention is not limited to such examples. It is clear that a person who has a common knowledge in the technical field to which the present invention pertains can arrive at various alterations and modifications within the technical idea described in the scope of claims; such alterations and modifications should be seen as within the technical scope of the present invention as a matter of course.

For example, although the above embodiment is described using a second member with a hat-like horizontal cross section as an example, the present invention is not limited to such an example, and the second member may be configured with an arbitrary horizontal cross section. For example, the present invention can be applied also to a second member having a gutter-like cross section without including the longitudinal flange 13.

Furthermore, although in the above embodiment the wall-thickened portion 20 is formed at the end of the ridge 19 in the rising curved surface portion 18, the present invention is not limited to such an example. For example, in the case where the wall-thickened portion is provided at the ends of the web part 11 and the wall part 12 in the rising curved surface portion 18, the unit joint may be provided so as to include a range in which the distance L from the boundary portion S between the wall-thickened portion and the end flange 16 is 3 mm or less. Also in the case where the unit joint is thus provided, the first member and the second member can be joined by utilizing an area at the end of the web part 11 or the wall part 12 where the curvature radius Rf of the rising curved surface portion 18 is small and the boundary portion S between the rising curved surface portion 18 and the end flange 16 is near the center position P of bending.

Furthermore, although the above embodiment is described using as an example the case where the end flange 16 of the floor cross member 10 as the second member is joined to a prescribed surface of the tunnel member 3 as the first member, the present invention is not limited to such an example. For example, joint structure bodies 1A and 1B like those shown in FIG. 16 and FIG. 17 are possible.

Figure 16:
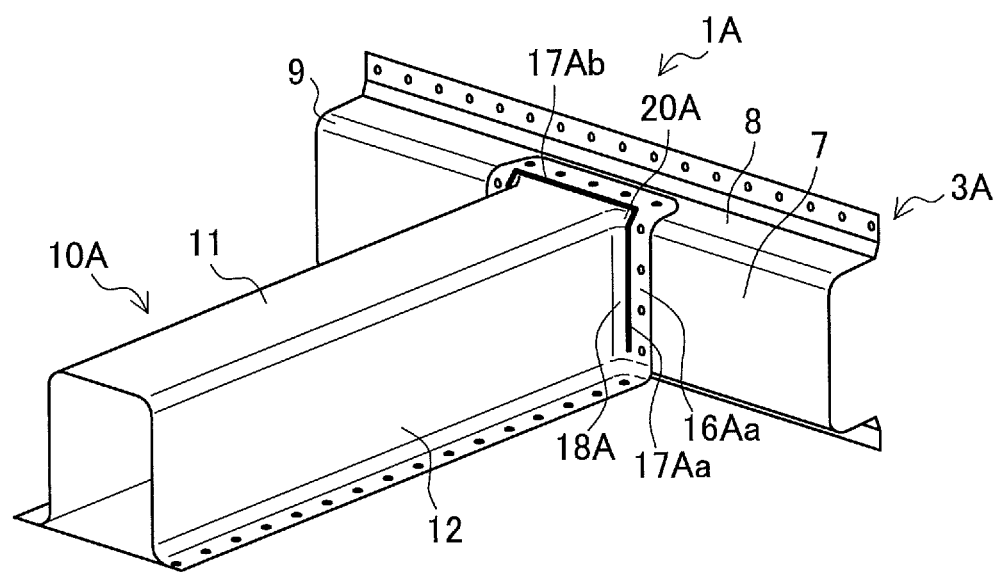
FIG. 16 is a perspective view showing another example of a joint structure body.

In the joint structure body 1A shown in FIG. 16, a second member 10A is joined to a first member 3A in a state where an end flange 16Aa formed at the end of the wall part 12 of the second member 10A is kept in contact with a web part 7 of the first member 3A and an end flange 16Ab formed by extending the web part 11 of the second member 10A is caught on a wall part 8 of the first member 3A. In the joint structure body 1A like this, a unit joint 17Aa is provided adjacent to the boundary portion between a rising curved surface portion 18A of the second member 10A and the end flange 16Aa. The unit joint 17Aa like this joins the second member 10A to the web part 7 of the first member 3A.

Further, in the joint structure body 1A, a unit joint 17Ab is provided adjacent to the boundary portion between a ridge 9 and the wall part 8 of the first member 3A. The unit joint 17Ab like this joins the second member 10A to the wall part 8 of the first member 3A. In the joint structure body 1A like this, the second member 10A is produced by, after the end flange 16 is once formed as shown in FIG. 2, bending the end flange 16 formed at the end of the web part 11. Therefore, the rising curved surface portion 18A includes a wall-thickened portion 20A. By providing the unit joint 17Aa adjacent to the boundary portion between the wall-thickened portion 20A and the end flange 16Aa, the torsional rigidity and the absorbed energy properties in axial crushing of the joint structure body 1A can be improved.

Figure 17:
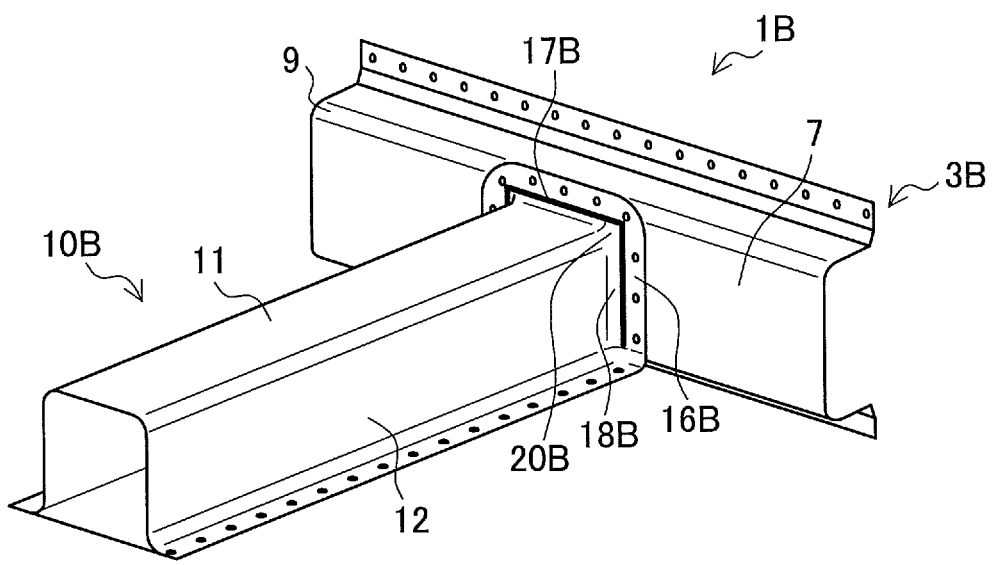
FIG. 17 is a perspective view showing another example of a joint structure body.

In the joint structure body 1B shown in FIG. 17, a second member 10B is joined to a first member 3B in a state where an end flange 16B formed at the ends of the web part 11 and the wall part 12 of the second member 10B is kept in contact with the web part 7 of the first member 3B. The end flange 16B formed at the end of the web part 11 of the second member 10B is bent so as to correspond to the shape of the ridge 9 of the first member 3B. Also in the joint structure body 1B like this, a unit joint 17B is provided adjacent to the boundary portion between a rising curved surface portion 18B and the end flange 16B of the second member 10B.

The unit joint 17B joins the second member 10B to the web part 7 of the first member 3B. The unit joint 17B is provided also in a position adjacent to the ridge 9 of the first member 3B. Also in the joint structure body 1B like this, the rising curved surface portion 18B is configured so as to include a wall-thickened portion 20B, and the unit joint 17B is provided adjacent to the boundary portion between the wall-thickened portion 20B and the end flange 16B; thereby, the torsional rigidity and the absorbed energy properties in axial crushing of the joint structure body 1B can be improved.

EXAMPLES

Examples of the present invention will now be described.
<Evaluation 1>
First, in evaluation 1, a member having a horizontal cross-sectional shape of an 80 mm×80 mm rectangular hollow cross section and a length of 500 mm was envisioned as the second member, and the properties of joint structure bodies in which various joints were formed on the member were evaluated by numerical calculation. The curvature radius Rp of the corner of the rectangular hollow cross section corresponding to the ridge was set to 10 mm. As the property values of the second member, the values of the mechanical properties of a high-tensile steel sheet with a sheet thickness of 1.4 mm and a tensile strength of the 590-MPa class were used.

Example 1

Figure 18:
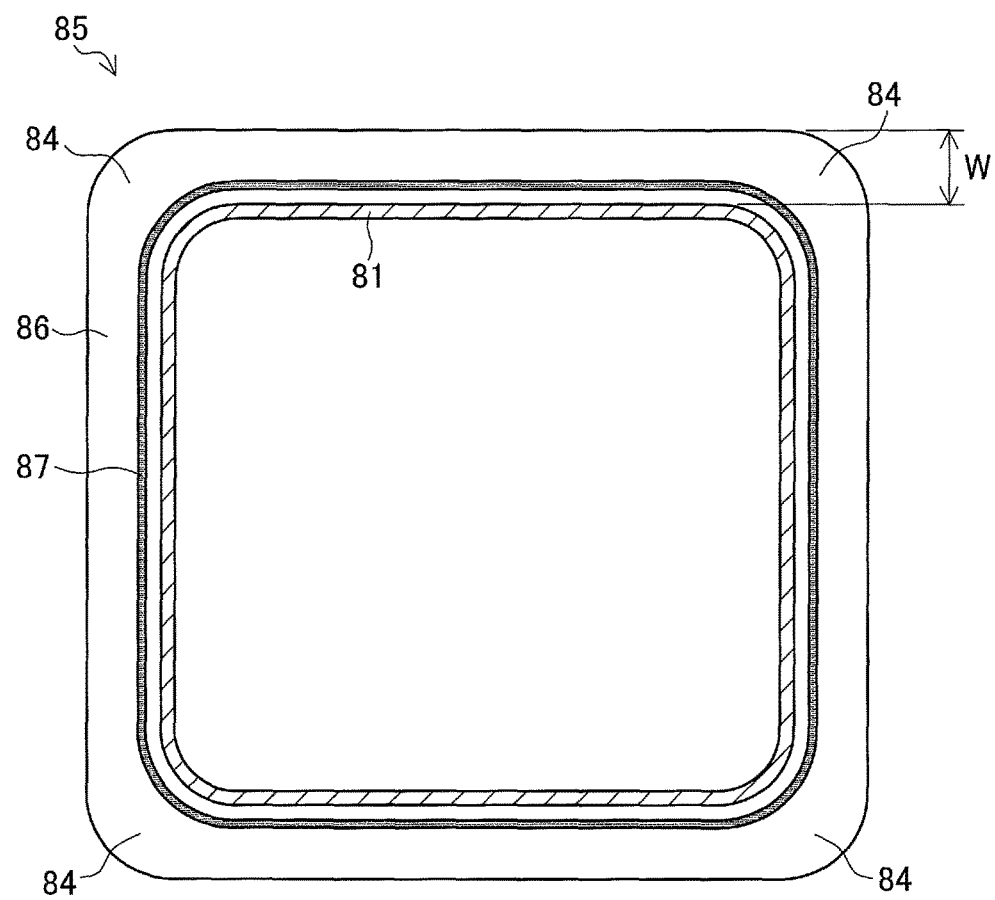
FIG. 18 is an illustration diagram showing a joint of Example 1.

In a joint 85 of a joint structure body of Example 1, as shown in FIG. 18, an end flange 86 was provided over the entire length of the outer periphery of the end of a member 81, and a unit joint 87 continuing over the entire length of the end flange 86 was formed. Here, the width W of the end flange 86 was 20 mm, the curvature radius Rf of the rising curved surface portion between the member 81 and the end flange 86 was 5 mm, and the curvature radius Rf of the rising curved surface portion between the member 81 and a ridge flange 84 was 4 mm. The unit joint 87 had the configuration shown in FIG. 4 or FIG. 5, and the distance L from the boundary portion S between the rising curved surface portion and the end flange 86 to the unit joint 87 was 3 mm.

FIG. 18 is a view of the member 81 as viewed facing the end flange 86 side.

Example 2

In Example 2, the same configuration as Example 1 was used except that the distance L mentioned above was set to 1 mm.

Example 3

In Example 3, the same configuration as Example 1 was used except that the configuration shown in FIG. 10 was used as the unit joint and the distance L mentioned above was set to 2 mm.

Example 4

Figure 19:
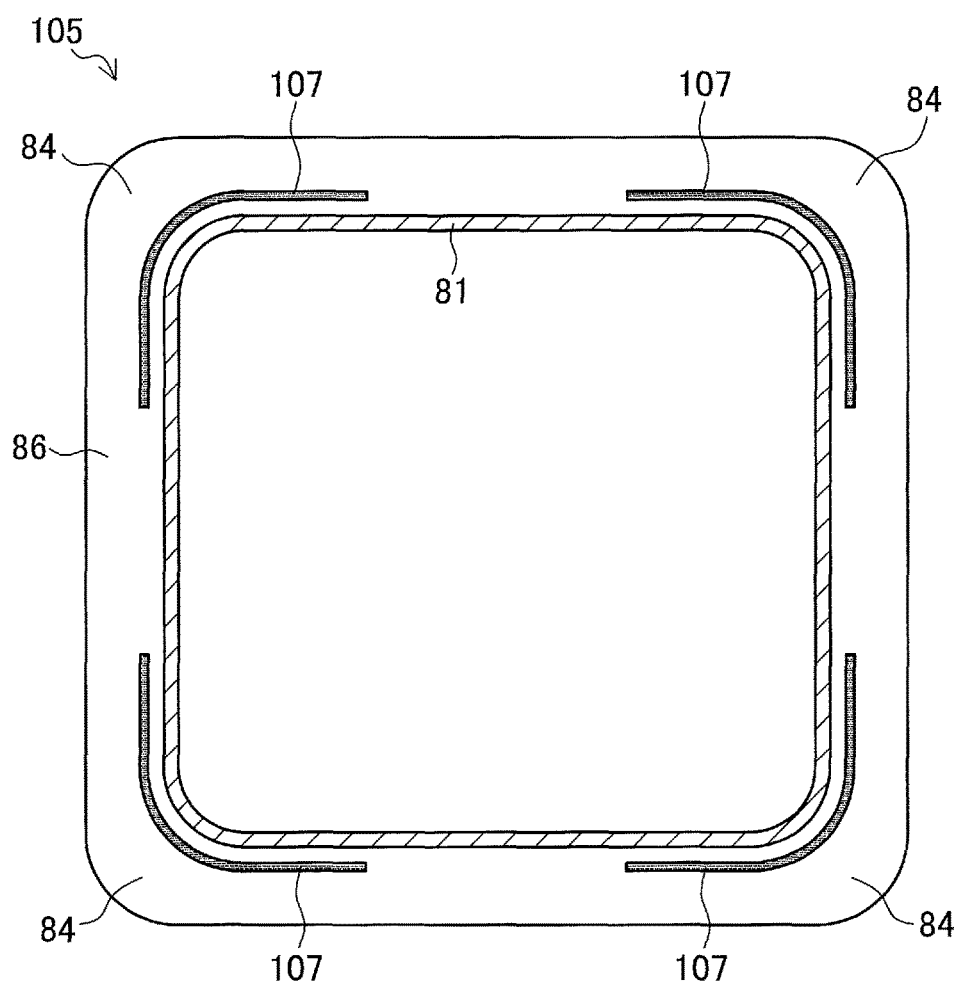
FIG. 19 is an illustration diagram showing a joint of Example 4.

A joint 105 of a joint structure body of Example 4 had a configuration similar to the configuration of Example 2; but as shown in FIG. 19, four unit joints 107 were provided intermittently so as to correspond to the position of the ridge flange 84. The four unit joints 107 were arranged in the four corners of the end flange 86, each with a length of 40 mm. That is, in Example 4, the range of 50% of the entire length of the end flange 86 was welded.

Comparative Example 1

Figure 20:
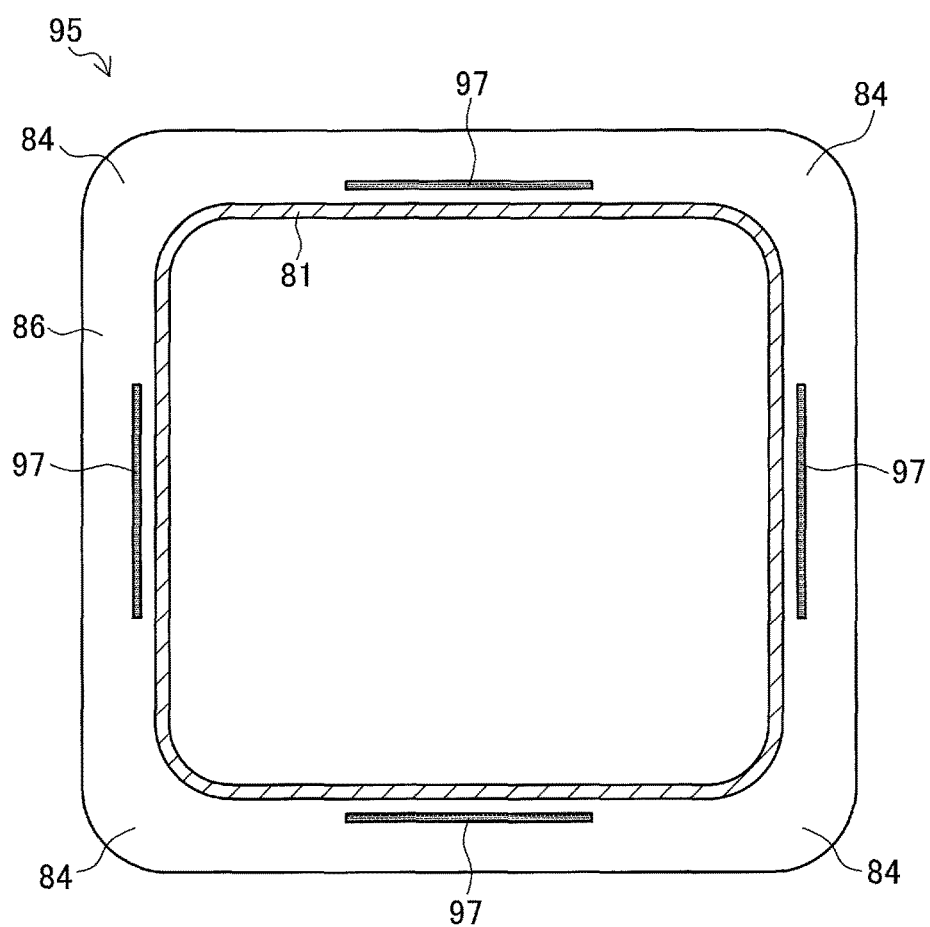
FIG. 20 is an illustration diagram showing a joint of Comparative Example 1.

A joint 95 of a joint structure body of Comparative Example 1 had a configuration similar to the configuration of Example 2; but as shown in FIG. 20, four unit joints 97 were provided intermittently along the end flange 86, and a unit joint was not provided in the position corresponding to the ridge flange 84. The four unit joints 97 were arranged on the four straight-lined sides of the end flange 86, each with a length of 40 mm. That is, in Comparative Example 1, the range of 50% of the entire length of the end flange 86 was welded.

Comparative Example 2

Figure 21:
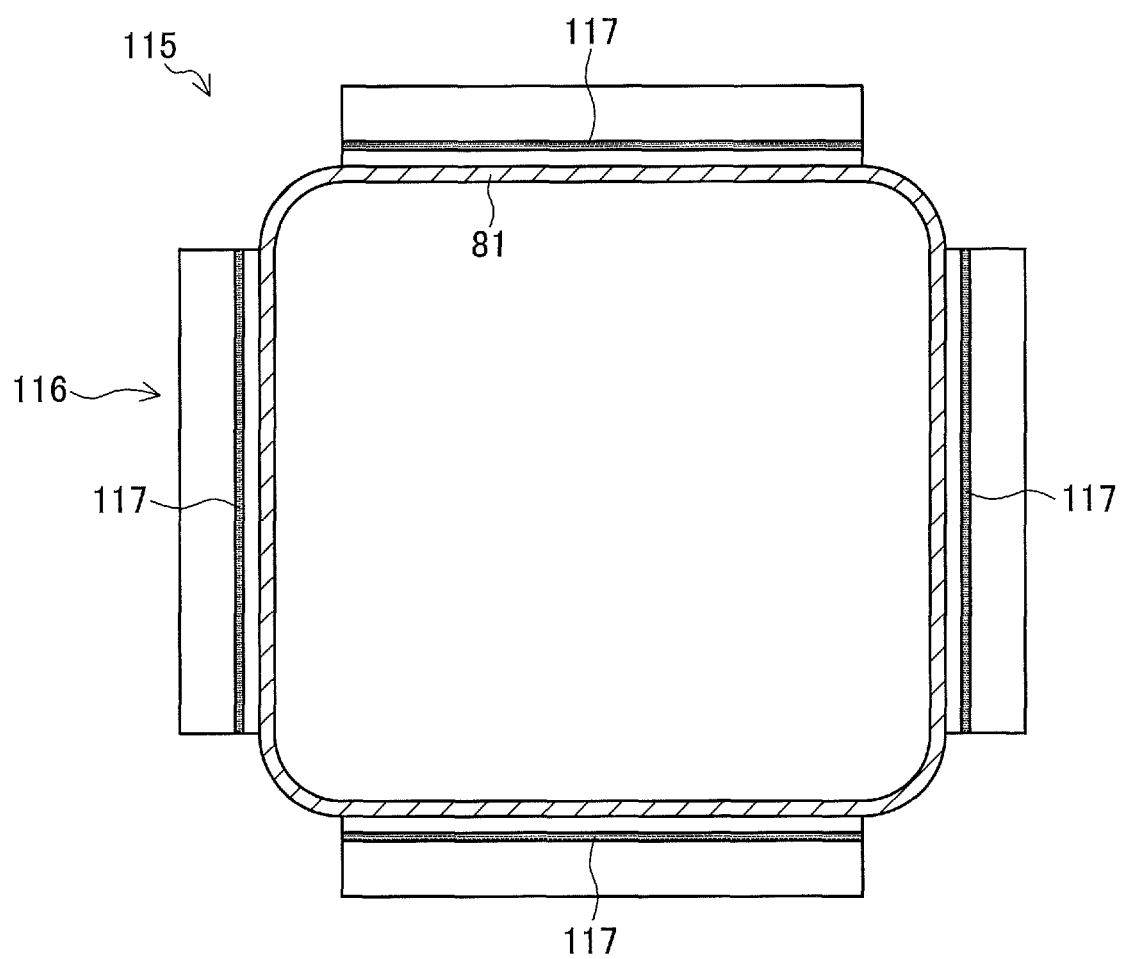
FIG. 21 is an illustration diagram showing a joint of Comparative Example 2.

A joint 115 of a joint structure body of Comparative Example 2 had a configuration similar to the configuration of Example 1; but as shown in FIG. 21, an end flange 116 was notched in the corners, and a ridge flange did not exist. In the end flange 116, a unit joint 117 was provided over the entire length of the end flange 116. The distance L from the boundary portion S between the rising curved surface portion and the end flange 116 to the unit joint 117 was set to 3 mm.

Comparative Example 3

A joint of a joint structure body of Comparative Example 3 was a similar configuration to Comparative Example 2 except that the distance L mentioned above was set to 1 mm.

Comparative Example 4

Figure 22:
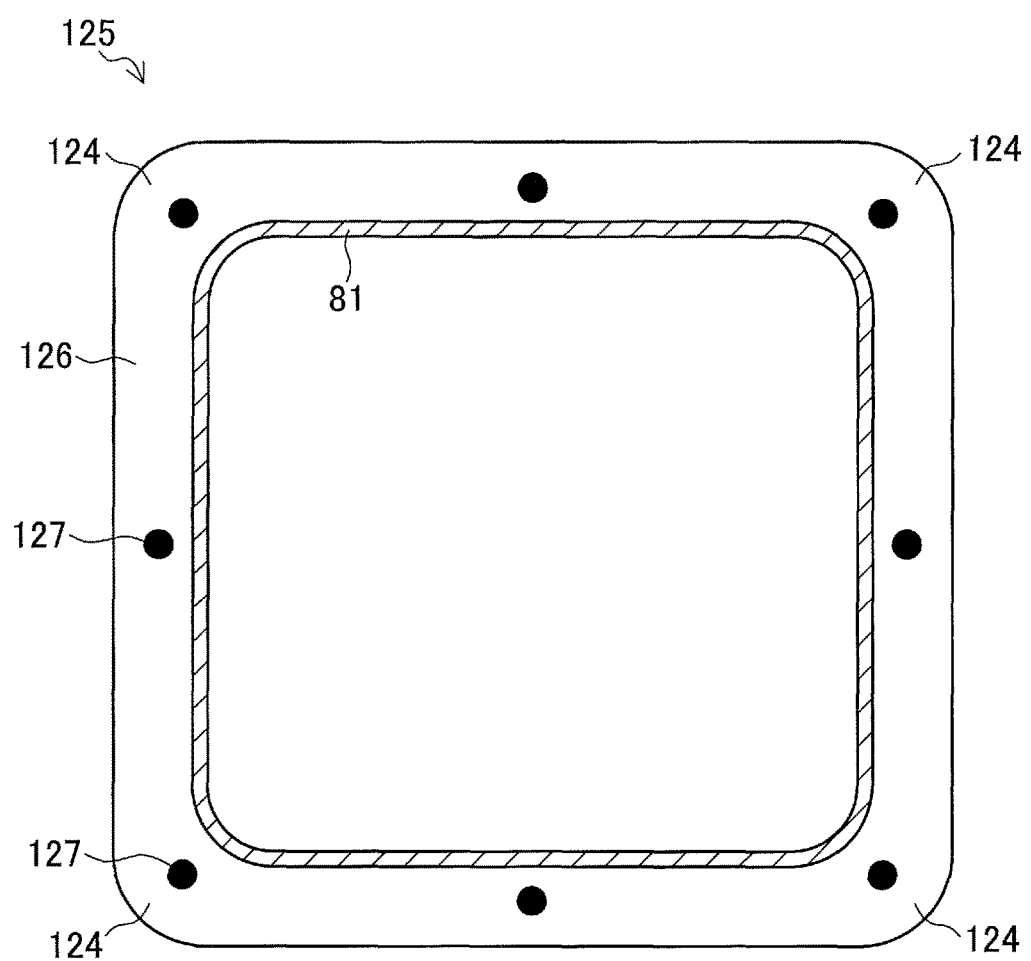
FIG. 22 is an illustration diagram showing a joint of Comparative Example 4.

In a joint 125 of a joint structure body of Comparative Example 4, as shown in FIG. 22, an end flange 126 running over the entire periphery was provided, and the end flange 126 was provided with eight spot welding portions 127. The distance L from the boundary portion S between the rising curved surface portion and the end flange 126 to the spot welding portion 127 was 7.5 mm.

Comparative Example 5

A joint of a joint structure body of Comparative Example 5 had a configuration similar to the configuration of Example 4; but the distance L mentioned above for, out of the eight spot welding portions 127, the four spot welding portions 127 provided in ridge flanges 124 was set to 4.0 mm.

(Evaluation method)

Figure 23:
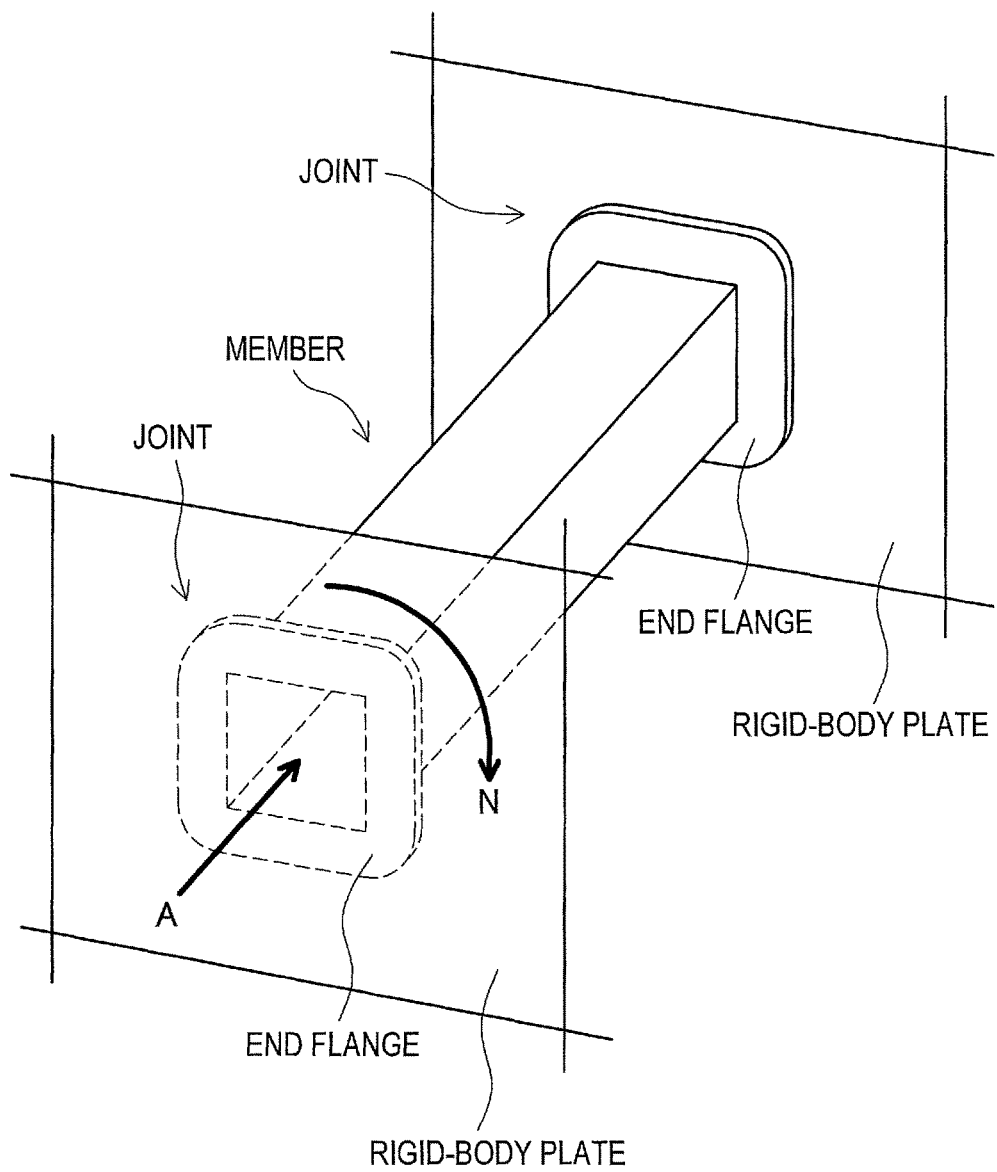
FIG. 23 is a diagram shown in order to describe an evaluation method.

FIG. 23 is an illustration diagram showing a method for evaluating the properties of the joint structure body of Examples and Comparative Examples. Herein, in a state where each of both ends of the member was joined to a rigid-body plate by the joint described in Examples and Comparative Examples mentioned above, the torsional rigidity when one rigid-body plate was rotated as shown by arrow N in FIG. 23 was evaluated. Further, in a state where both ends of the member were joined to rigid-body plates in the similar way, the axial crushing properties when one rigid-body plate was pressed so as to be compressed in the axial direction as shown by arrow A in FIG. 23 were evaluated.

(Results of evaluation 1)

Figure 24:
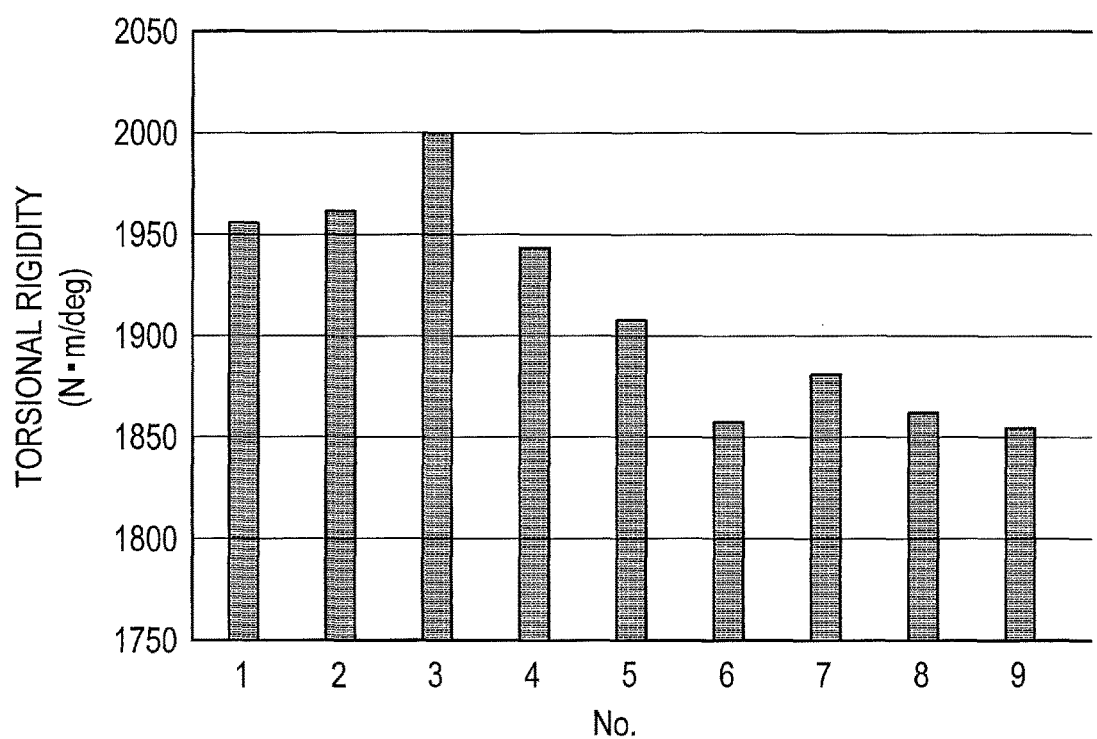
FIG. 24 is a graph describing results of torsional rigidity in evaluation 1.
Figure 25:
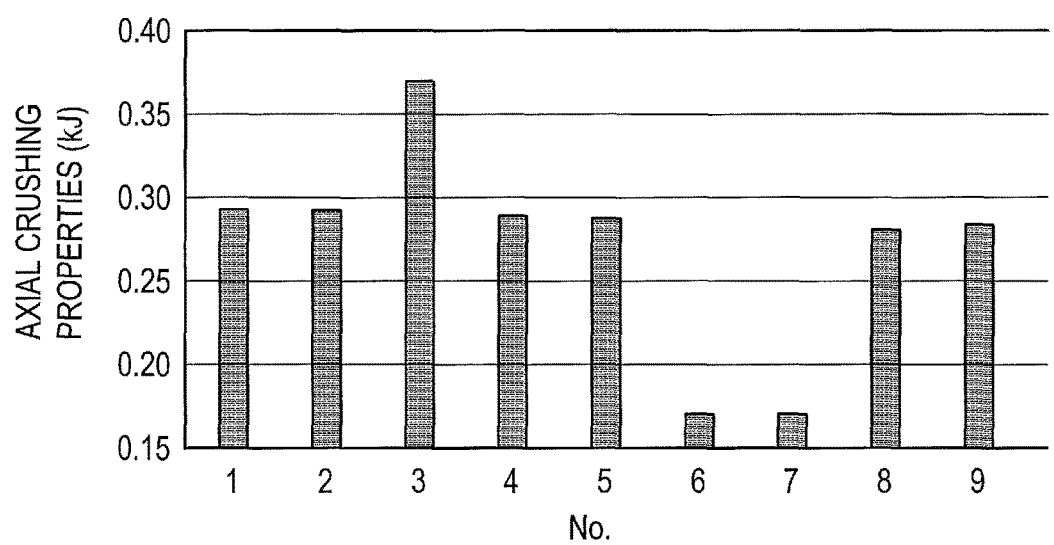
FIG. 25 is a graph describing results of axial crushing properties in evaluation 1.

Table 1 shows the evaluation results. The torsional rigidity is expressed by the moment per degree of the torsion angle (N·m/deg), and the axial crushing properties are expressed by the absorbed energy (kJ) at amounts of the crushing stroke of up to 5 mm. FIG. 24 and FIG. 25 show graphs of the torsional rigidity and the axial crushing properties based on Table 1. FIG. 24 shows the torsional rigidity in each Example and Comparative Example, and FIG. 25 shows the axial crushing properties in each Example and Comparative Example.

TABLE 1

| No. | Torsional rigidity (N · m/deg) | Axial crushing properties (kJ) | |
|---|---|---|---|
| 1 | 1956 | 0.292 | Example 1 |
| 2 | 1962 | 0.292 | Example 2 |
| 3 | 2001 | 0.369 | Example 3 |
| 4 | 1943 | 0.288 | Example 4 |
| 5 | 1906 | 0.290 | Comparative Example 1 |
| 6 | 1855 | 0.173 | Comparative Example 2 |
| 7 | 1880 | 0.173 | Comparative Example 3 |
| 8 | 1860 | 0.282 | Comparative Example 4 |
| 9 | 1849 | 0.284 | Comparative Example 5 |

As can be seen from Table 1, FIG. 24, and FIG. 25, the joint structure bodies having the joints according to Examples have higher performance in both the torsional rigidity and the axial crushing properties than the joint structure bodies of Comparative Examples.

Although in each Example and each Comparative Example the second member was configured as a member having a rectangular hollow cross section for easier calculation, a similar tendency is exhibited also in the case where the second member has a hat-like or gutter-like cross section.

<Evaluation 2>

Next, in evaluation 2, a joint structure body of a configuration similar to the configuration of the joint structure body of Example 2 mentioned above was used, and the curvature radius Rf of the rising curved surface portion of the end flange was varied; and the differences between the properties of the joint structure bodies were evaluated by numerical calculation. The envisioned shape of the second member, the property values, and the method for evaluating the torsional rigidity and the axial crushing properties were the same as the conditions of evaluation 1.

Herein, the curvature radius Rf of the rising curved surface portion formed over the entire length of the outer periphery of the end of the member was set to five values of 1 mm, 3 mm, 5 mm, 8 mm, and 12 mm. Further, the unit joint was set in the range of 1 mm from the boundary portion S between each rising curved surface portion and each end flange in the end flange direction.

(Results of evaluation 2)

Figure 26:
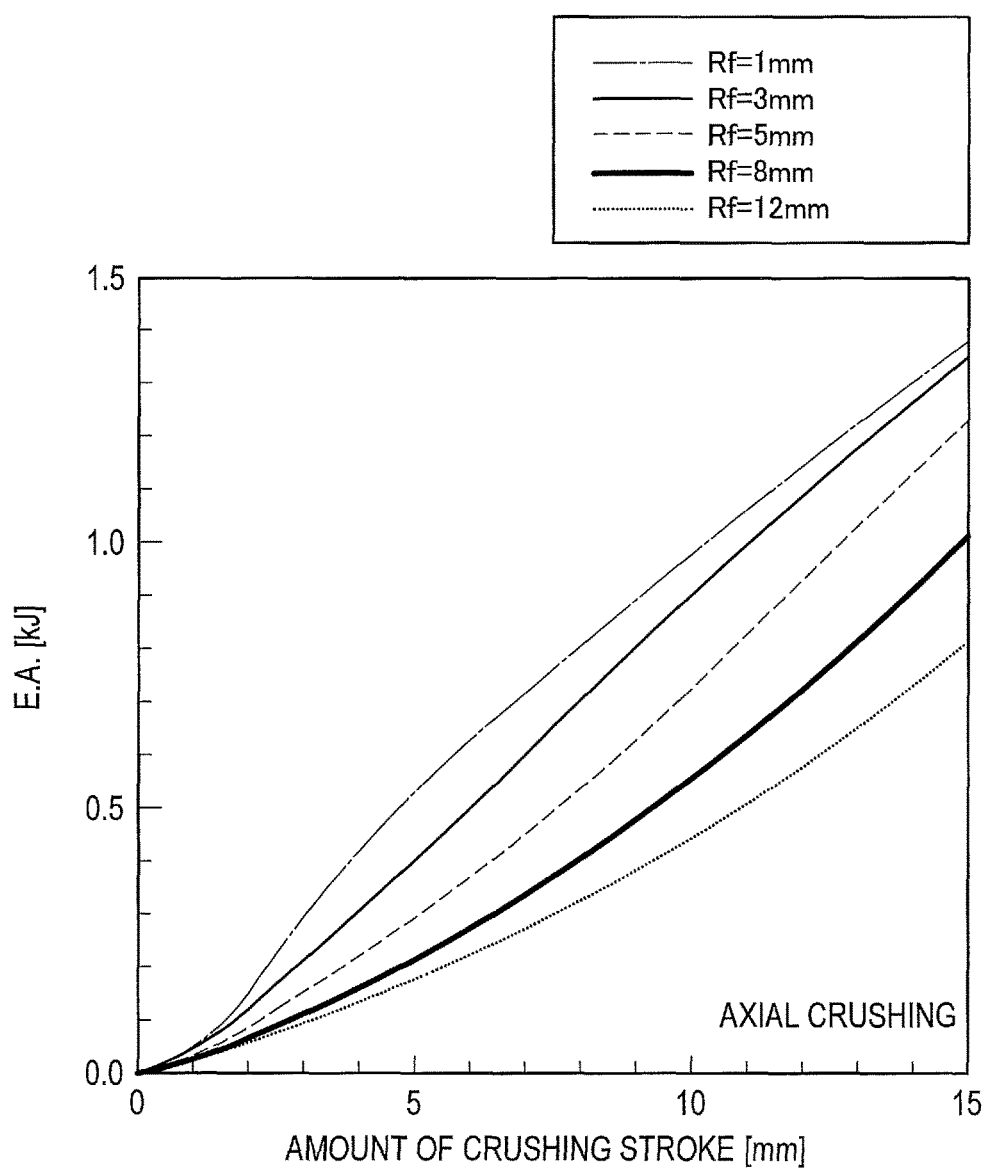
FIG. 26 is a graph describing results of axial crushing properties in evaluation 2.
Figure 27:
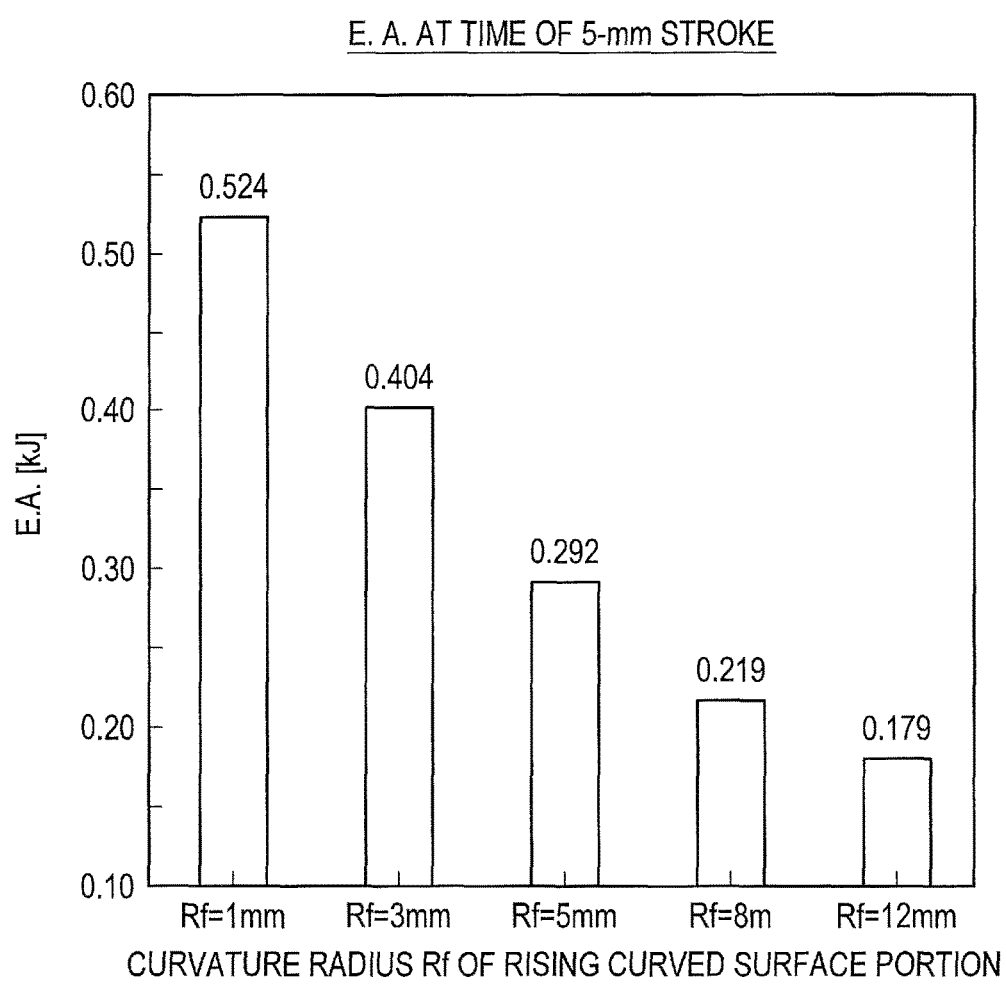
FIG. 27 is a graph describing the results of the axial crushing properties in evaluation 2.
Figure 28:
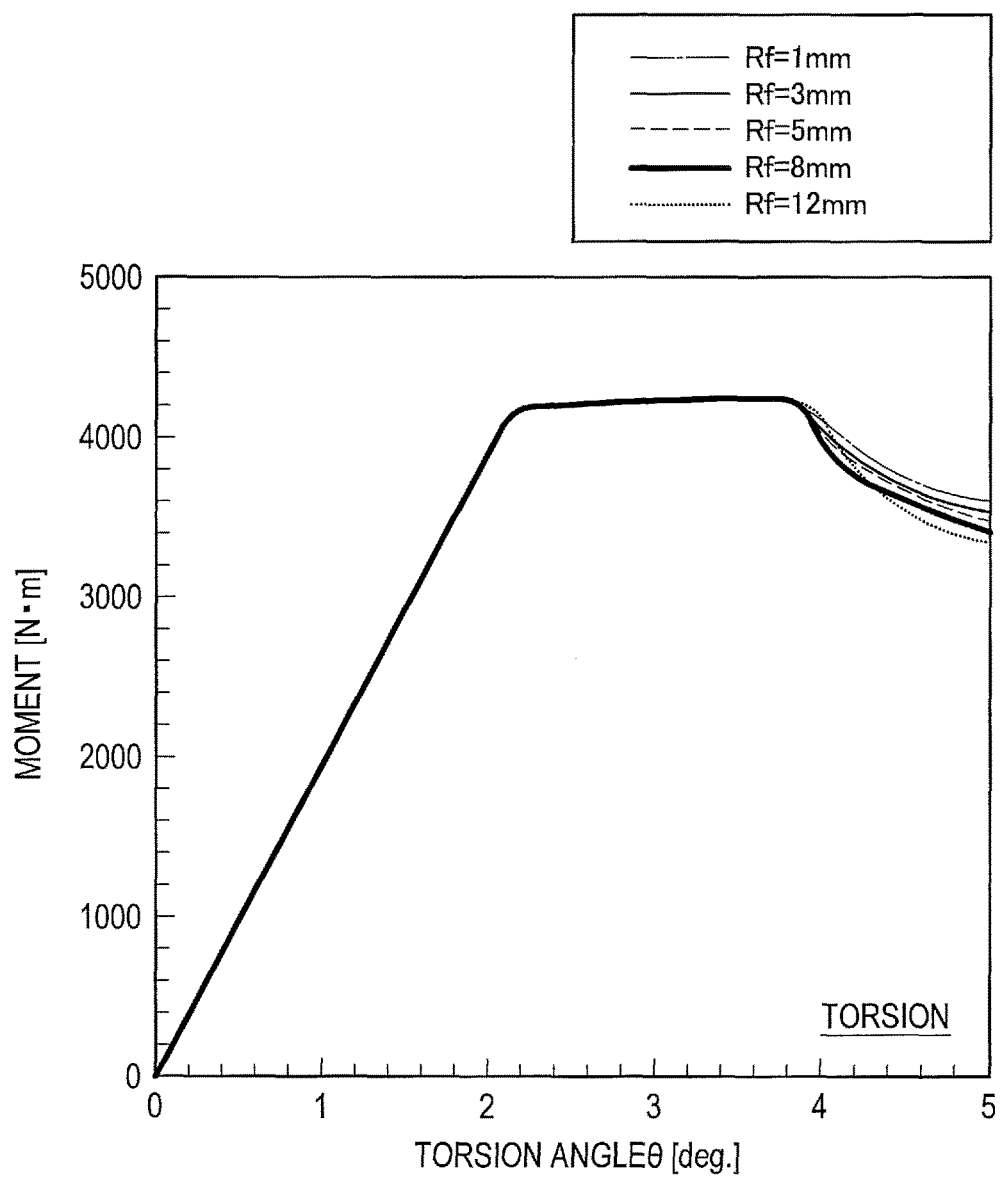
FIG. 28 is a graph describing results of torsional rigidity in evaluation 2.
Figure 29:
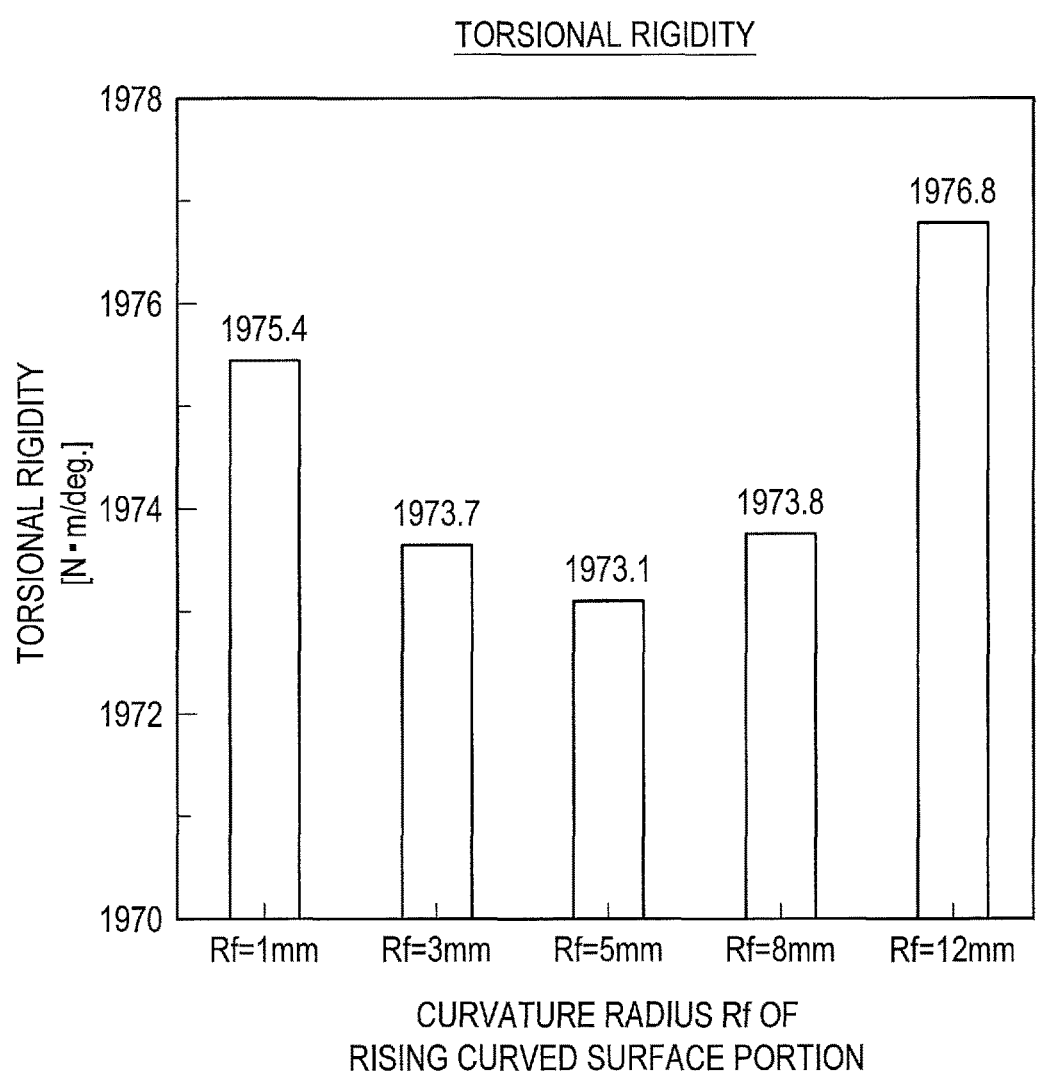
FIG. 29 is a graph describing the results of the torsional rigidity in evaluation 2.

FIG. 26 and FIG. 27 show the axial crushing properties. FIG. 26 shows the relationship between the amount of the crushing stroke (mm) and the absorbed energy (kJ) for each curvature radius Rf, and FIG. 27 shows the absorbed energy (kJ) at amounts of the crushing stroke of up to 5 mm for each curvature radius Rf. FIG. 28 and FIG. 29 show the torsional rigidity. FIG. 28 shows the relationship between the torsion angle (deg) and the moment (N·m) for each curvature radius Rf, and FIG. 29 shows the moment per degree of the torsion angle (N·m/deg) for each curvature radius Rf.

As can be seen from FIG. 26 and FIG. 27, by reducing the curvature radius Rf of the rising curved surface portion and forming the unit joint adjacent to the boundary portion S between the rising curved surface portion and the end flange, the axial crushing properties are improved. On the other hand, as can be seen from FIG. 28 and FIG. 29, the torsional rigidity exhibits a minimum value when the curvature radius Rf of the rising curved surface portion is 5 mm, and the torsional rigidity is improved by reducing or increasing the curvature radius Rf. Therefore, it can be seen that, in order to improve both the axial crushing properties and the torsional rigidity, it is preferable that the curvature radius Rf of the rising curved surface portion be reduced and the unit joint be formed adjacent to the boundary portion S between the rising curved surface portion and the end flange.

REFERENCE SIGNS LIST 1 car body (joint structure body)
2 floor
3 tunnel member (first member)
4 floor member
10 floor cross member (second member)
11 web part
12 wall part
13 longitudinal flange
14 ridge flange
15 joint
16 end flange
17 unit joint
18 rising curved surface portion
19 ridge
20 wall-thickened portion
Rf curvature radius of rising curved surface portion
S boundary portion between rising curved surface portion and end flange (ridge flange)

The invention claimed is:

1. A joint structure body of members comprising:
a first member;
a second member, an end of the second member being thrust against a surface of the first member; and
a joint that joins the first member and the second member,
wherein the joint includes an end flange that is formed continuously along the end of the second member and of which at least one part overlaps the surface of the first member and a unit joint that joins the end flange and the first member,
the end flange is formed continuously to at least one part of the end of the second member via a rising curved surface portion and the rising curved surface portion includes a wall-thickened portion of which a sheet thickness is made larger than a sheet thickness of the second member, and
at least one part of the unit joint is provided in a range of 3 mm or less from a boundary between the end flange and the wall-thickened portion.

2. The joint structure body of members according to claim 1, wherein
the second member has a substantially hat-like or gutter-like cross-sectional shape,
the end flange includes a ridge flange formed at an end of a ridge between a web part and a wall part forming the substantially hat-like or gutter-like shape, and
the rising curved surface portion between the ridge and the ridge flange is formed as the wall-thickened portion.

3. The joint structure body of members according to claim 2, wherein the unit joint is formed continuously from the end of the ridge to an end of at least one part of the web part and the wall part continuing to the ridge.

4. The joint structure body of members according to claim 1, wherein the unit joint is formed continuously over an entire length of one part of the end flange, the part being in contact with the surface of the first member.

5. The joint structure body of members according to claim 1, wherein unit joints are formed intermittently in the end flange, and a length of the unit joints is a length of 50% or more of an entire length of an area where the end flange and the first member are in contact.

6. The joint structure body of members according to claim 1, wherein a spot welding portion is further provided in the joint.

7. The joint structure body of members according to claim 1, wherein the first member is a floor tunnel or a side sill of an automobile, and the second member is a floor cross member.

* * * * *